United States Patent [19]

McIntyre et al.

[11] Patent Number: 5,751,399
[45] Date of Patent: May 12, 1998

[54] FILM SLIDES HAVING DATA WINDOWS

[75] Inventors: Dale F. McIntyre; Daniel M. Pagano, both of Honeoye Falls; David L. Patton, Webster; Edward Weissberger, Pittsford, all of N.Y.

[73] Assignee: Eastman Kodak Company, Rochester, N.Y.

[21] Appl. No.: 775,814

[22] Filed: Dec. 31, 1996

[51] Int. Cl.[6] .................................................... G03B 21/14
[52] U.S. Cl. ................................................ 353/120; 40/701
[58] Field of Search ............................. 353/120, 25, 26 R, 353/122, DIG. 2; 40/701, 704

[56] References Cited

U.S. PATENT DOCUMENTS

| | | |
|---|---|---|
| 2,655,833 | 10/1953 | Krows . |
| 3,290,987 | 12/1966 | James et al. . |
| 3,451,934 | 6/1969 | Hubbard . |
| 3,468,603 | 9/1969 | Kovarik et al. . |
| 3,551,042 | 12/1970 | Brink et al. . |
| 3,601,482 | 8/1971 | Harvey . |
| 3,601,913 | 8/1971 | Pollock . |
| 3,784,296 | 1/1974 | Davis ........................... 353/120 |
| 3,808,404 | 4/1974 | Riggs . |
| 3,902,262 | 9/1975 | Colegrove et al. . |
| 3,981,570 | 9/1976 | Ashida et al. . |
| 4,005,530 | 2/1977 | Takahashi et al. . |
| 4,067,647 | 1/1978 | Gallina . |
| 4,068,945 | 1/1978 | Spence-Bate . |
| 4,083,631 | 4/1978 | Gugeler . |
| 4,122,613 | 10/1978 | Karalus et al. . |
| 4,165,159 | 8/1979 | Landau et al. . |
| 4,243,698 | 1/1981 | Marzel et al. . |
| 4,363,055 | 12/1982 | Lee . |
| 4,385,814 | 5/1983 | Elliott . |
| 4,420,234 | 12/1983 | Dolejsi et al. . |
| 4,434,467 | 2/1984 | Scott . |
| 4,568,161 | 2/1986 | DiGianfilippo et al. . |
| 4,616,926 | 10/1986 | DiPietro et al. . |
| 4,758,485 | 7/1988 | Drexler ........................... 353/120 |
| 4,765,734 | 8/1988 | Truc et al. ........................ 353/120 |
| 4,791,496 | 12/1988 | Kageyama et al. . |
| 4,878,073 | 10/1989 | Hoousbeer ...................... 353/120 |
| 4,884,885 | 12/1989 | Schweidsberg ................. 353/120 |
| 4,974,096 | 11/1990 | Wash . |
| 4,977,419 | 12/1990 | Wash et al. . |
| 4,983,996 | 1/1991 | Kinoshita . |
| 5,021,820 | 6/1991 | Robison et al. . |
| 5,080,479 | 1/1992 | Rosenberg . |
| 5,082,730 | 1/1992 | Takeda et al. . |
| 5,093,686 | 3/1992 | Shigaki . |
| 5,113,062 | 5/1992 | Fujita et al. . |
| 5,126,863 | 6/1992 | Otsuka et al. . |
| 5,130,745 | 7/1992 | Cloutier et al. . |
| 5,151,333 | 9/1992 | Kitahara et al. . |
| 5,229,810 | 7/1993 | Cloutier et al. . |
| 5,317,436 | 5/1994 | Spitzer et al. . |
| 5,333,033 | 7/1994 | Blackman . |
| 5,363,156 | 11/1994 | Tianello et al. . |
| 5,376,979 | 12/1994 | Zavracky et al. . |
| 5,396,304 | 3/1995 | Salerno et al. . |
| 5,424,790 | 6/1995 | Tsunefuji et al. . |
| 5,428,417 | 6/1995 | Lichtenstein . |
| 5,436,682 | 7/1995 | Katoh et al. . |
| 5,475,464 | 12/1995 | DeCook et al. . |
| 5,485,232 | 1/1996 | Saito et al. . |
| 5,521,663 | 5/1996 | Norris, III . |
| 5,526,011 | 6/1996 | Hix et al. . |
| 5,541,644 | 7/1996 | Nanba . |
| 5,619,738 | 4/1997 | Petruchik et al. . |

FOREIGN PATENT DOCUMENTS 3-73987  3/1991  Japan .

OTHER PUBLICATIONS

Advertising Brochure—Pakon, Data Mount, Slide Information System.

Primary Examiner—William Dowling
Attorney, Agent, or Firm—Robert Luke Walker

[57] ABSTRACT

A film slide including a transparency having an image section bearing a visual image and a data section bearing encoded data relating to the visual image; and a mount having front and back panels. The panels each define an image window overlapping the image section. At least one of the panels defines a data window overlapping the data section.

7 Claims, 19 Drawing Sheets

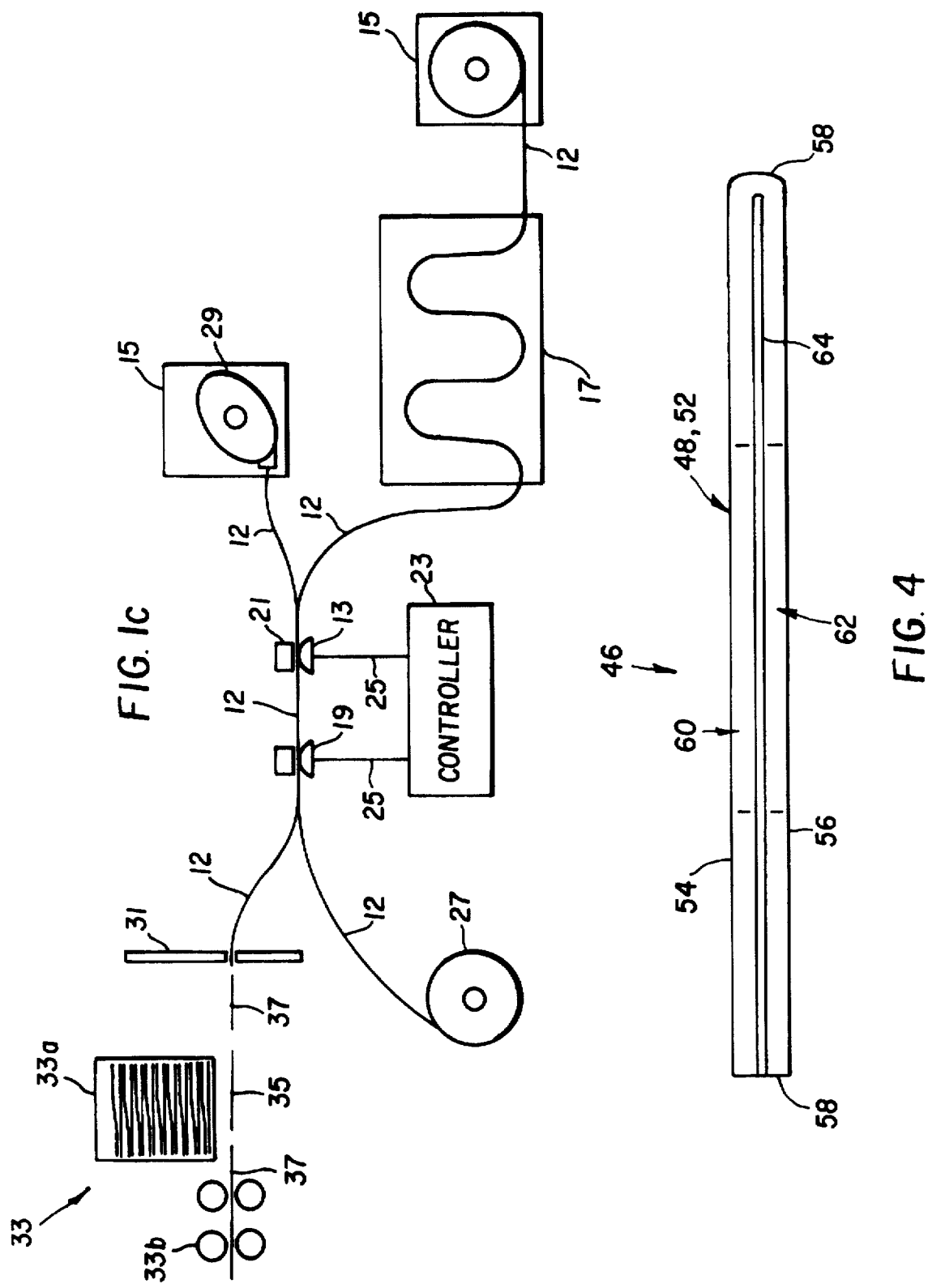

FILM SLIDES HAVING DATA WINDOWS

CROSS-REFERENCE TO RELATED APPLICATIONS

Reference is made to commonly assigned co-pending U. S. patent applications Ser. No. 08/775,677, entitled: METHOD AND APPARATUS FOR PREPARING PHOTOGRAPHIC FILM UNITS HAVING IMAGE FRAME ASSOCIATED ENCODED INFORMATION, and filed in the names of Richard Bauer, Dale McIntyre, Daniel Pagano, David Patton, Edward Weissberger; Ser. No. 08/775,326, entitled: FILM SLIDES HAVING ENCODED DATA AND METHODS FOR PREPARING FILM SLIDES, and filed in the names of Dale McIntyre, Daniel Pagano, David Patton, and Edward Weissberger; Ser. No. 08/775,321, entitled: ORIENTING PROJECTOR and filed in the names of Dale McIntyre, Daniel Pagano, David Patton, and Edward Weissberger; Ser. No. 08/775,816, entitled: FORMATTING PROJECTOR and filed in the names of Dale McIntyre, Daniel Pagano, David Patton, and Edward Weissberger; Ser. No. 08/775,847, entitled: ANNOTATION DISPLAYING PROJECTOR and filed in the names of Dale McIntyre, Daniel Pagano, David Patton, and Edward Weissberger, each of which are assigned to the assignee of this application all filed on Dec. 31, 1996.

FIELD OF THE INVENTION

The invention relates to photographic slides and more particularly relates to improved film slides having data windows.

BACKGROUND OF THE INVENTION

Photographic films are available in which information relating to individual image frames can be encoded on the film. Advanced Photo System™ (APS™) films are examples of such films. Encoding in these films is optical or magnetic or both. The encoded information can be read during film processing and, for negative films, can then be printed in whole or in part on the prints of the respective image frames. Positive films are commonly used as slides. Some previous slide mounts for use with 35 mm films have provided a magnetically recordable area. These mounts are relatively complex and expensive.

It would thus be desirable to provide film slides that have readable encoded information and have simple, inexpensive mounts.

SUMMARY OF THE INVENTION

The invention is defined by the claims. The invention, in its broader aspects, provides a film slide including a transparency having an image section bearing a visual image and a data section bearing encoded data relating to the visual image; and a mount having front and back panels. The panels each define an image window overlapping the image section. At least one of the panels defines a data window overlapping the data section.

It is an advantageous effect of at least some of the embodiments of the invention that they provide film slides that have readable encoded information and have simple, inexpensive mounts.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein:

FIG. 1c is a semi-diagrammatical view of an embodiment of the apparatus for preparing photographic film units having image frame associated encoded information.

FIG. 4 is a side pan view of an alternative embodiment of the improved slide of FIG. 3.

DESCRIPTION OF PARTICULAR EMBODIMENTS

Figure 1A:
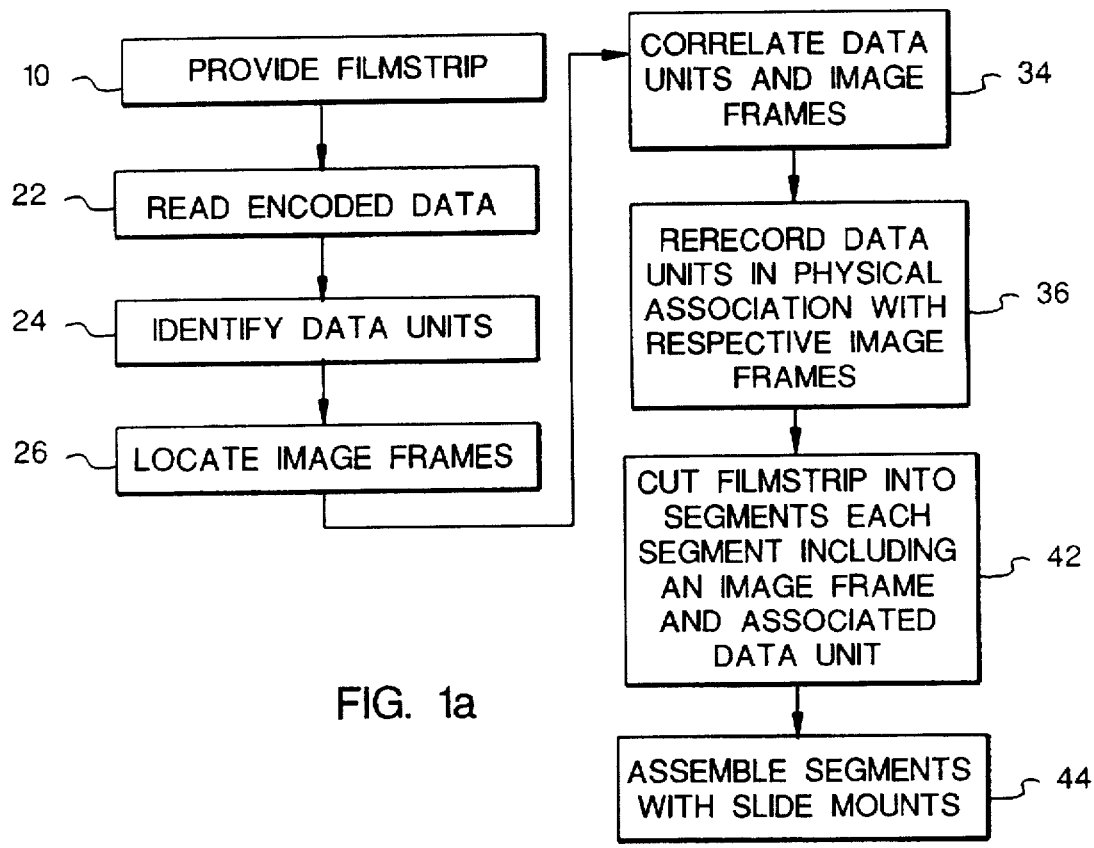
FIG. 1a is a schematic of an embodiment of the improved method for preparing photographic film units having image frame associated encoded information.
Figure 1B:
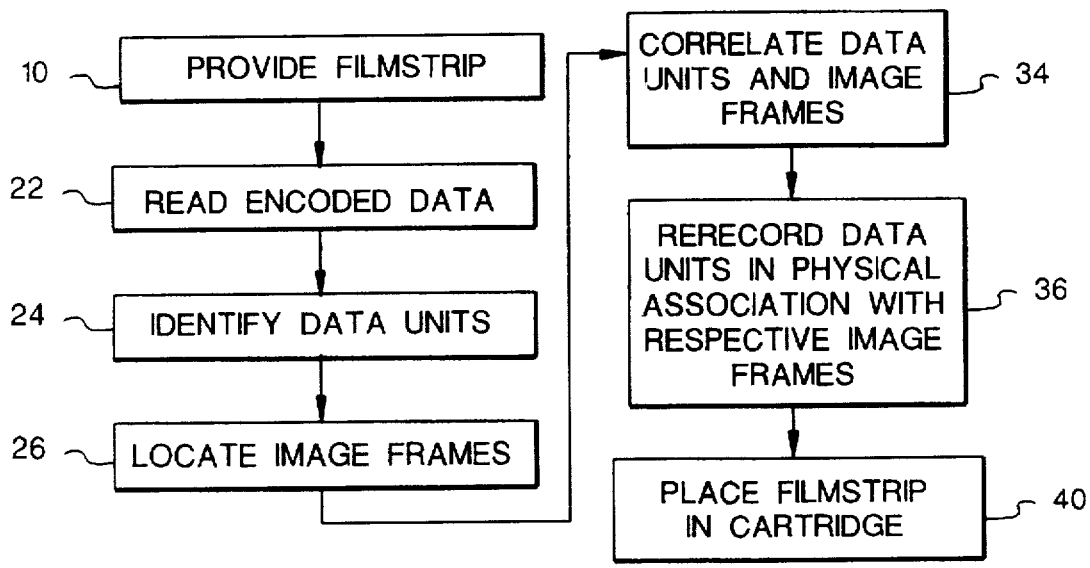
FIG. 1b is a schematic of another embodiment of the improved method for preparing photographic film units having image frame associated encoded information.

FIGS. 1a and 1b show two embodiments of the method for preparing photographic film units having image frame associated encoded information. The terms "image frame" and "film frame" are used here to refer to a portion of film bearing a single visible image or a similar portion of film bearing a single latent image. The image frame associated encoded information or data includes information that relates to respective image frames. The film units are either filmstrips or short mounted or unmounted film segments.

Figure 2:
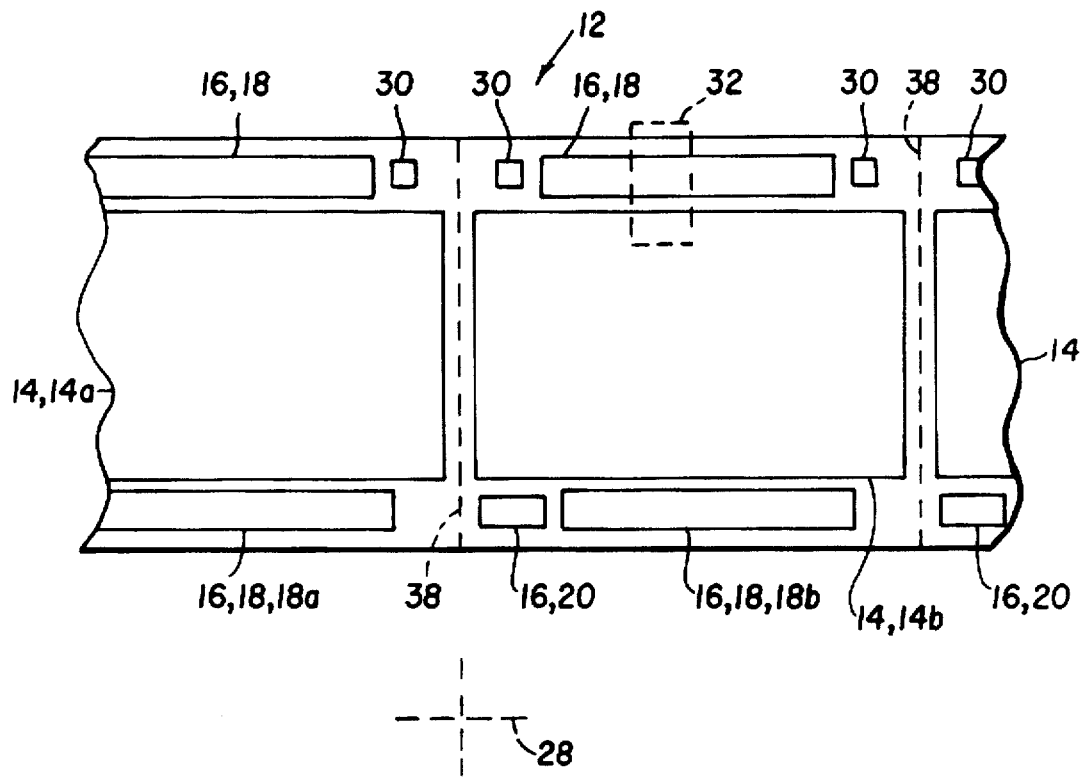
FIG. 2 is a semi-diagrammatical view of a filmstrip usable in the method of FIG. 1.

Referring now to FIGS. 1a, 1b, and 2, the method starts by providing (10) a filmstrip 12 having a plurality of film frames 14 bearing optical information (either visible images or latent images that after processing will become visible images). One or more areas (hereafter also referred to as data areas 16) bordering the film frames can bear encoded information in magnetic or optical form or both. Magnetic and optical data areas 18, 20, respectively; on an idealized filmstrip are indicated in FIG. 2. Optical information can be as simple as one or more spots of greater density in predetermined areas or can be more complex. Magnetic information can be provided in all or part of one or more magnetic data areas 20. Optical or magnetic information can also be provided as recorded in a layer overlying the film frame (hereafter also referred to as frame data layer, not separately illustrated), or on the leader or trailer of the film, or on an article associated with the film, such as a film cartridge or data disc.

The filmstrip is developed either as a part of the providing step (10) or in a separate procedure independent of the method. In the next step shown in FIGS. 1a and 1b, the encoded data is read (22) from the provided filmstrip. If the filmstrip is not developed prior to the method, then the actual relative order of developing the filmstrip and reading the data is largely a matter of convenience. Optical encoded data is read after development. Magnetic encoded data can be read before or after development.

APS film includes optical and/or magnetic data and APS film can be processed on equipment that has the ability to read this data prior to processing and process the film accordingly. Detailed information on this is presented in U.S. Pat. Nos. 5,130,745; 5,229,810; and 4,977,419 which are hereby incorporated herein by reference. Data read in this manner could be utilized in the method of the invention, on the other hand, the data could also be read independently. For example, the filmstrip can be developed on one piece of equipment and then some time later, the filmstrip could be transferred to another piece of equipment to read the data. It is highly preferred that the method be fully automated, or at least that non-automated steps be minimized; for example, non-automated steps being limited to a transfer from a processor to another piece of equipment.

After the encoded data has been read, a data unit is identified (24) for later rewriting. A data unit is one or more items of information, including or responsive to information obtained in the reading step (22); that are to be associated with a particular image frame 12. The nature of the information in the data unit is not subject to particular limitations; however, it is preferred that the data unit be limited to or predominantly the information obtained in the reading step (22). That information is generally going to fit into one of two categories: information useful in processing the film (hereafter "processing data") and information of interest to the user of the developed film (hereafter "image data"). The data unit can include only image data or both image data and processing data.

In the identifying of the data unit, the information read is stored and/or manipulated to provide a data unit for later rewriting. It is preferred that the information read be stored and then modified to provide a data unit which is then stored. The terms "stored", "storing", and the like; are used broadly here to refer to a wide variety of procedures in which information is retained in a logic structure prior to further transfer. The logic structure can be as simple as a mechanic logic element; however, in view of size and speed limitations, it is highly preferred that the logic structure be a memory unit of a microprocessor or digital computer, or a separate digital memory device that is readable by a microprocessor or digital computer such as a hard disc or floppy disc. The storage method is not critical. For example, data could be stored in magnetic form, without compression, as a series of discrete files on a conventional storage device such as RAM memory of a central processing unit, a hard disc, or a disc array. Data could also be stored, in compressed form, in a large file on optical storage medium, such as a writable compact disc. A variety of other approaches are available and within the knowledge of one of skill in the art.

During the identifying step, the stored data can be manipulated or modified in a wide variety of ways. For example, the data can be reformatted and be assigned to one or more computer files which can be combined or associated with computer instructions necessary for further transfer of the data. As a part of the storing step, the stored data can be edited to modify specific information or add or remove other information. The modification of the data can be fully automatic; or can be automatic, but subject to optional intervention; or can require operator input for each image frame. It is highly preferred that the identification step, including any modification of data, be at least substantially automatic and based upon predetermined criteria, so as to maximum the speed of the method. This function can be provided by an appropriately programmed microprocessor or computer.

In the next step shown in FIGS. 1a and 1b, the image frames 14 are located (26), relative to each other and an external reference point (indicated in FIG. 2 by a dashed cross 28). The relative timing and procedure used in locating the image frames, like the relative timing of developing the filmstrip and procedures for reading and storing the encoded data, is largely a matter of convenience. The image frames 14 can be located in a wide variety of ways including mechanical logic based on film travel or counting the passage of a predetermined number of perforations 30. It is preferred that the image frames be located by a sensor that detects a film feature disposed at a constant geometric relationship to the image frame 14. (The sensor, indicated by dashed box 32 in FIG. 2, can have a fixed or determinable physical separation from the external reference point 28.) For example, the sensor can detect an edge of a magnetic region, or an optical spot, or an edge of the image frame itself, or an edge of a perforation. Once the predetermined film feature has been detected, the location of the image frame relative to the reference point is known.

In the next step shown in FIGS. 1a and 1b, data units are correlated (34) with respective image frames. This step prepares for the next step in which the data unit is rerecorded (36) onto the filmstrip in physical association with the respective image frame.

The correlation step can be provided in a variety of ways. For example, transport of located image frames can be synchronized with the reading of encoded data and the rewriting of data units. Referring to FIG. 2, in this example, a provided filmstrip 12 could have encoded data relating to a first frame 14a magnetically recorded in a magnetic data area 18b adjacent a second frame 14b. (This arrangement is convenient for cameras, since data can be recorded during film advance.) The data unit and respective image frame could be correlated by limiting the data unit for the first image frame 14a to information read from the magnetic data area 18b. After writing data area 18a would bear the data unit for image frame 14a. With image frames at a constant spacing, neighboring magnetic heads could be used for reading and writing. In this case, reading and writing are almost simultaneous and data storage is very temporary.

In rerecording, the data unit is written to the filmstrip in the physical proximity of a respective image frame. Each data unit is more closely associated with its respective image frame than with neighboring image frames. For example, referring to FIG. 2, the data unit for an image frame 14b is preferably rerecorded within an area indicated by the boundaries 38, or more preferably rerecorded within the magnetic data areas 18 between boundaries 38. The data unit can be rerecorded so as to overwrite existing data or can be added to existing data. (Optical information, by the nature of photographic film, is not rewritten. The method can be utilized to rewrite optical data as magnetic data.) It is currently preferred that data units be written to overwrite existing data areas of the filmstrip. It is also preferred that the data units not be rerecorded onto the film data layer overlying the image frame.

The data correlated filmstrip having image frame associated data units produced at the end of the rerecording step can be utilized as a filmstrip or can be cut into segments and then utilized. In the former case, shown in FIG. 1b, it is preferred that an additional step be provided, in which the filmstrip is placed (40) in a cartridge or other holder. For example, in the case of APS film, and filmstrip can be returned to the original cartridge, from which the film came, and can be utilized in that cartridge in a projector or other device. In the latter case, shown in FIG. 1a, the segments of data correlated filmstrip (also referred to herein as "data correlated film segments" and "data-film segments") are cut (42) so that each segment includes an image frame and associated data unit. In a preferred embodiment, each segment includes a single image frame and the segments are cut apart at predetermined boundaries 38 as shown in FIG. 2. The boundaries 38 are separated from image frames and magnetic data sufficiently to eliminate or minimize loss of data or image. The data-film segments can be utilized as cut pieces. In a preferred embodiment of the method, the data-film segments are assembled (44) with slide mounts to form completed slides which can then be utilized in slide projectors and the like.

Many of the steps of the method for preparing photographic film units having image frame associated encoded information have been described as if a step, such as reading or identifying, were performed on the entire filmstrip before moving on to the next step. Steps of the method can be performed this way; however, it is generally more convenient to perform most of the steps of the method on image frames and data units in succession. This allows greater speed, since steps such as reading, rerecording, and cutting can take place simultaneously on different parts of the same filmstrip.

The method for preparing photographic film units having image frame associated encoded information has been described here in relation to a continuous filmstrip, however, this method can be applied to shorter lengths of film. Alternatively, segments can be cut from the filmstrip as an initial step, before or after processing. Such embodiments utilizing segments or short lengths of film are not preferred, because of the increased difficulties of film handling and an increased risk of miscorrelation of data units and film segments.

FIG. 1c shows an apparatus for preparing photographic film units having image frame associated encoded information. A filmstrip 12 is delivered to a read head 13 either directly from a store 15 or alternatively after passage through a developing unit 17. The filmstrip 12 then travels past a rerecord or write head 19. Each head 13,17 is shown with a backing pad 21. The heads 13,17 are operatively connected to a controller 23 by lines 25. After passage by heads 13,17, the filmstrip is wound onto a take-up 27, for use as a filmstrip (optionally after return to a cartridge 29) or along an alternative path to a cutter or guillotine 31 and mounter 33 (illustrated as a mount feeder 33a and fastener 33b). The path of a cut film segment 35 is indicated by arrows 37. Film drives are not illustrated, but can be provided by conventional means such as pairs of opposed rollers.

Figure 3:
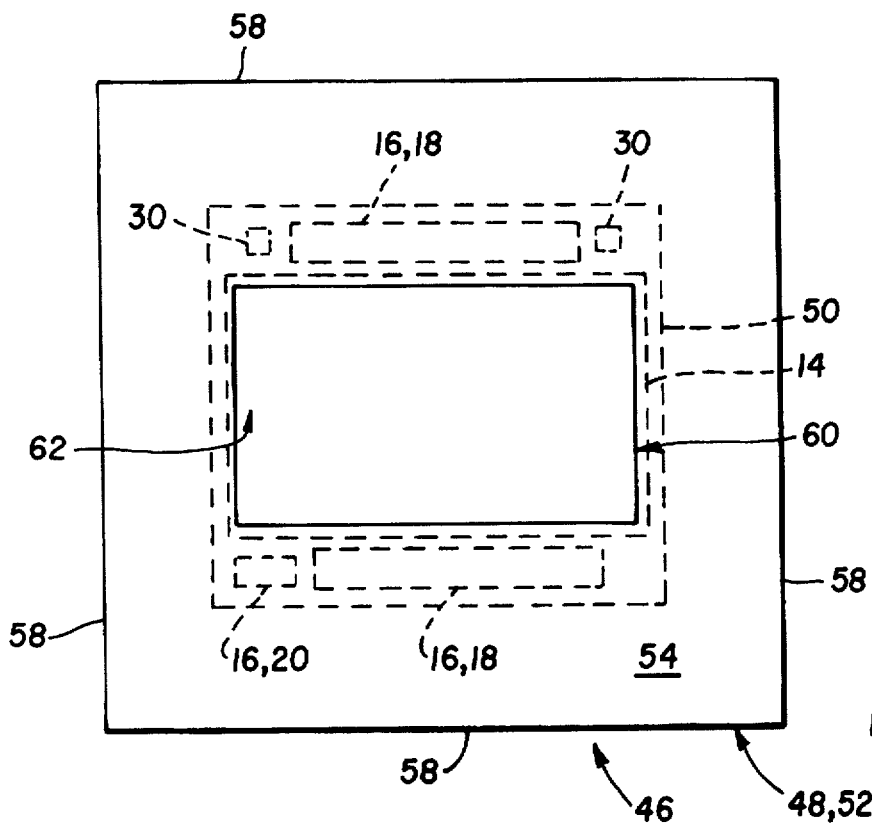
FIG. 3 is a front plan view of a first improved slide. Locations on the segment of filmstrip within the mount are indicated by dashed lines.

Referring now to FIGS. 3–4, a first improved slide 46 has a mount 48 which surrounds a data correlated transparency 50. The transparency can be a data-film segment produced as above-described or can be a sheet of material bearing encoded data and a transmitted light viewable image printed using inks, electrophotographic toner, or the like. As a matter of convenience the following discussion will generally refer to a data-film segment, but it will be understood that the same discussion also applies to other data correlated transparencies.

The data-film segment 50, as discussed above, has an image frame 14, and one or more data areas 16 bearing encoded information. The data areas 16 are inclusive of one or more magnetic data areas 18, optical data areas 20, or both.

The mount 48 has one, or two, or more panels or cards 52 that are joined together over the data-film segment 50 by fasteners, adhesive or the like. A single panel 52 folded over the data-film segment 50 is shown in FIG. 4. The mount 48 has front and rear faces 54,56 respectively, and two pair of opposed edges 58. The faces 54,56 define a pair of image windows 60,62 which overlap each other and the image frame 14. The data-film segment 50 is preferably spaced apart from all of the edges 58 of the mount 48 and inset from both faces 54,56 to reduce the risk of foreign objects damaging the data-film segment.

The mount 48 is configured such that the data-film segment 50 can be assembled in the mount 48 and be removed without substantial damage to the data-film segment 50. The mount 48 can be subject to damage by the removal procedure, or can be configured to withstand removal and return of the data-film segment 50 and reassembly. For example, referring to FIG. 4, the mount 48 can be fastened together by an adhesive layer 64 that can be delaminated and reattached or replaced. If the mount is held together by fasteners or heat or solvent welding or the like, the fastened area (not separately illustrated) is preferably spaced apart from the data-film segment to protect against damage. The mount 48 sandwiches the data-film segment 50 and covers at least a portion of the data areas 16 of the data-film segment 50. The mount 48 thus provides mechanical protection for the data areas 16 of the data-film segment 50.

The recorded data unit on the data-film segment 50 provides an archival function. More immediate access to the data unit is provided by the mount 48 itself. The panel 52 of the mount 48, or in the case of multi-panel mounts, at least one panel 52 of the mount 48 is made of a magnetically-recordable material. The panel 52 can, and preferably does include, a magnetic record of all or at least part of the data unit. In preferred embodiments the mount is made of a single panel of magnetically-recordable material or has multiple panels, but each panel is magnetically-recordable. The result in these embodiments is a relatively large magnetic storage capacity and the mount can include more magnetically recorded data than is present on the data-film segment. Recordable areas of the mount are not limited to faces. One or more edges 58 can bear recorded information. Information can be repeated in different locations on the mount to permit slides to be read in multiple orientations.

A variety of materials can be used for the panels 52 of the mount 48 such as those used to make credit cards that include a magnetically recordable area. Examples of such materials are disclosed in U.S. Pat. Nos. 3,601,913; 5,113,062; 4,243,698; 3,451,934; 3,902,262; 5,151,333; 3,808,404; and 5,082,730. Particularly convenient materials are disclosed in U.S. patent application Ser. No. 08/418,731, entitled "METHOD OF MAKING A MAGNETICALLY ENCODEABLE CARD HAVING MAGNETIC PARTICLES UNIFORMLY DISTRIBUTED THROUGHOUT", filed Apr. 7, 1995, by Robert James, Mary-Irene Condo, Bradford West, and Lawrence Rowley and U.S. patent application Ser. No. 08/418,336, entitled "MAGNETICALLY ENCODABLE CARD HAVING MAGNETIC PIGMENT UNIFORMLY DISPERSED IN PLASTIC", filed Apr. 7, 1995, by T. Jagielinski, F. Jeffers, and R. O. James. Both applications are commonly assigned to the assignee of this application, and are hereby incorporated herein by reference. With these materials, the magnetically encodeable particles are disbursed throughout and any or substantially all portions of the card or panel are magnetically recordable. (As a practical matter, magnetic recording is conveniently provided on one or both faces 54,56 and one or more edges 58 of the slide.)

Figure 5:
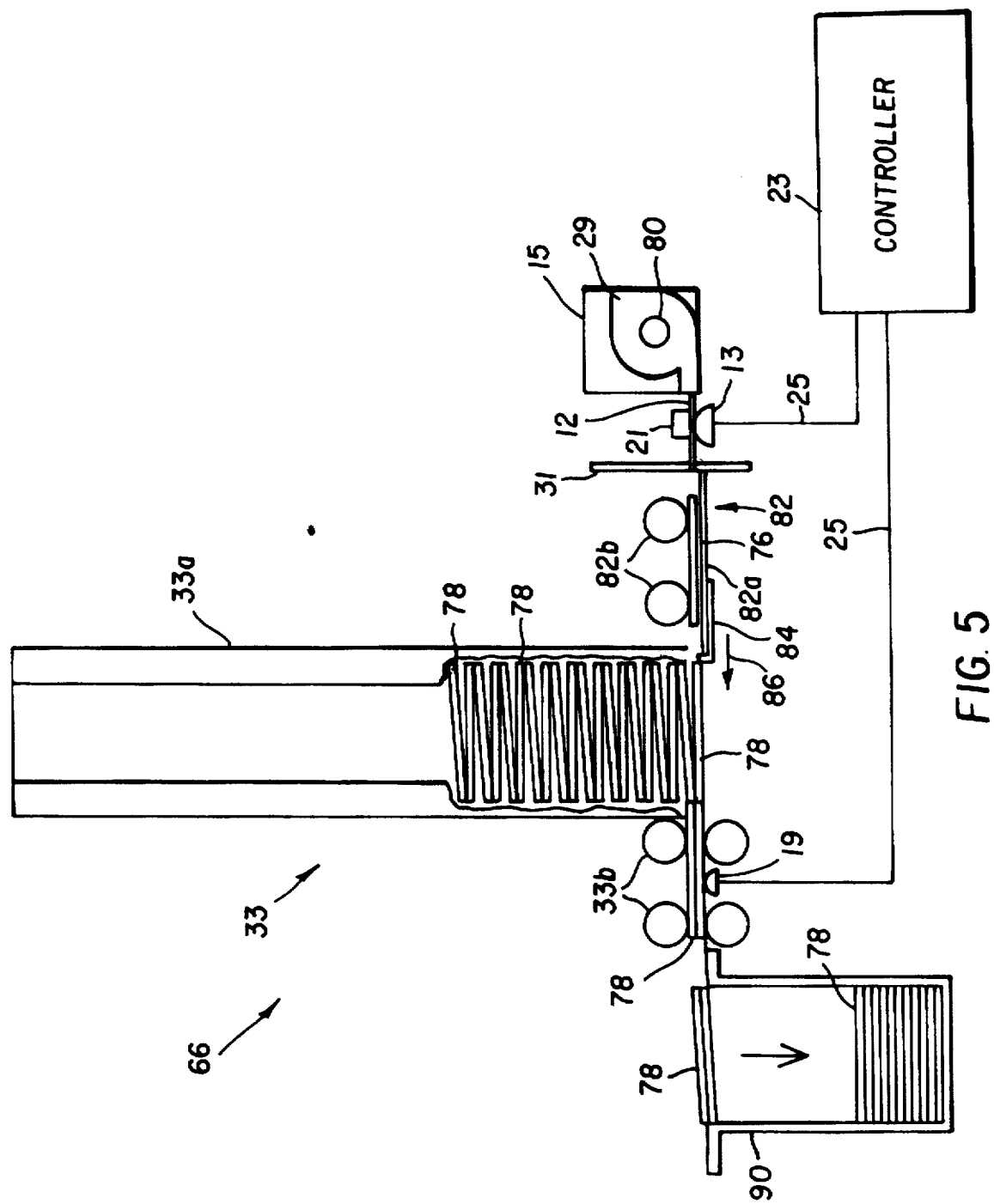
FIG. 5 is a semidiagrammatical view of an improved slide mounting apparatus.
Figure 6:
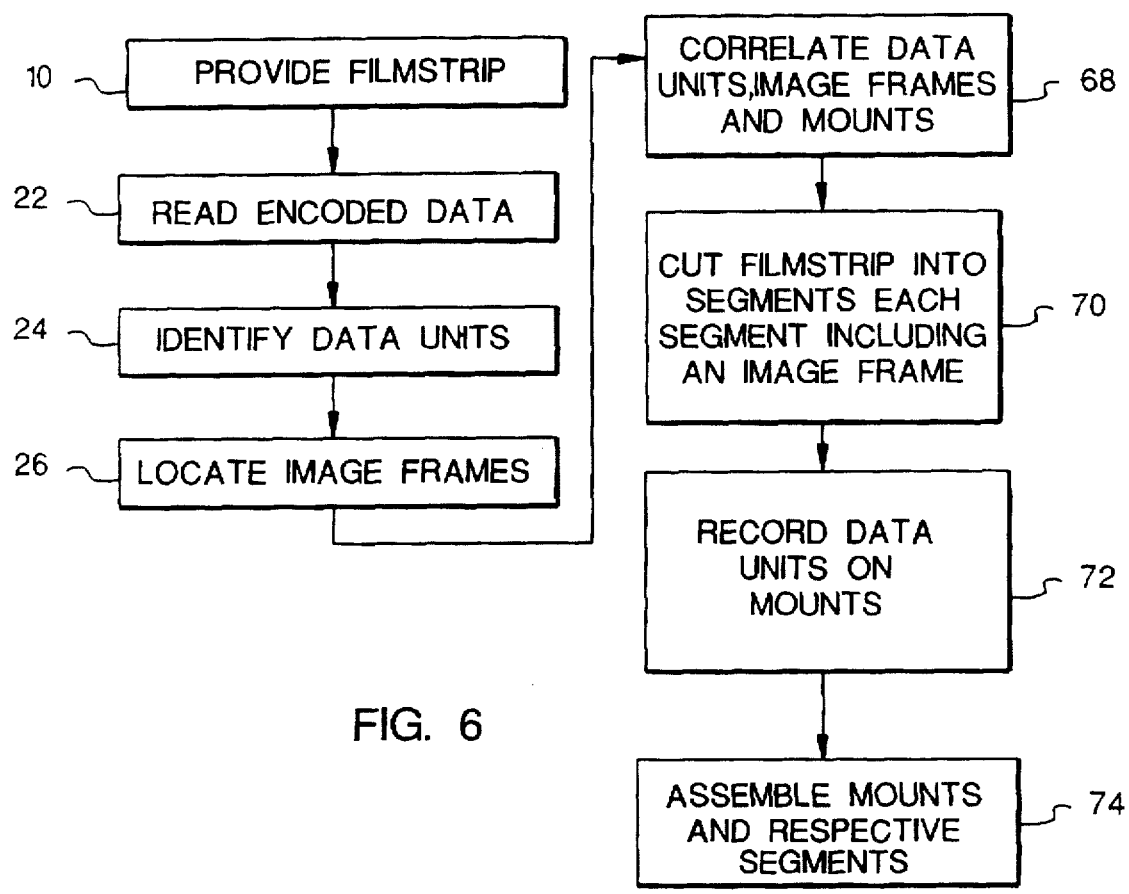
FIG. 6 is a schematic of an improved method for mounting slides.

FIGS. 5 and 6 show an improved slide mounting apparatus 66 and method. (Some components of the apparatus 66 are the same or comparable to components of the apparatus for preparing photographic film units having image frame associated encoded information previously discussed. Some steps of the slide mounting method similarly mirror steps of the method for preparing photographic film units having image frame associated encoded information. In both cases, considerations already discussed in relation to similarly named components and steps also apply here, except as indicated.) A filmstrip 12 is provided (10) from a store 15. FIG. 5 illustrates the store or source 15 as holder 15 and cartridge 29; however, the nature of the filmstrip source is not critical. For example, the filmstrip can be supplied from a large reel prepared by splicing together shorter segments or directly from film processing equipment.

Encoded data is read (22) by a read head 13. The data read is transmitted to a controller 23 where the data unit is identified (24) for later recording (66) on the mount. Image frames are located (26) relative to a reference point and data units, image frames, and mounts are correlated (68). The filmstrip 12 is cut into segments 76 by a cutter 31, each segment 76 including an image frame. The data units are recorded (72) on respective mounts 78 by a write head 19 and the mounts 78 and respective film segments 76 are assembled (74).

As previously indicated, the providing (10), reading (22), identifying (24), and locating (26) steps in this method are substantially similar to the steps of the method for preparing photographic film units having image frame associated encoded information previously discussed. The correlating (68), cutting (70), recording (72), and assembling (74) steps of this method resemble, but are not the same as similarly named steps of the method for preparing photographic film units having image frame associated encoded information previously discussed. One difference is that the data unit is recorded onto the mount and not rerecorded onto the respective film segment. Another difference relates to the correlation step. As in the earlier method, prior to the writing step, data units must be correlated to respective image frames. Unlike that method, data units must be correlated to particular mounts and image frames (or more correctly) portions of film including an image frame must be correlated with a particular mounts. As in the earlier method, correlation can be provided by any of a variety of means. For example, equipment can be operated in lock-step or items can be separated and later reassociated by reference to identifying characteristics such as magnetic codes or optical marks.

As in the previous method, the specific order of steps such as cutting and recording is not critical; however, it is highly preferred that the steps follow an order which reduces the chance of error. For example, the filmstrip could be cut into segments before reading, but this generally creates a greater risk of error than if the filmstrip is first read and then cut. Similarly, a risk of error may be reduced if a mount is written only after assembly with a segment.

Referring now to the details of the embodiment of the apparatus shown in FIG. 5, the filmstrip 12 is driven from the supply 15 by thrusting the filmstrip from the cartridge 29 using a drive element (indicated by circle 80). The filmstrip 12 travels past the read head 13 which reads the encoded data and sends the data to the controller 23 which can be, for example, a personal computer having a hard drive or other digital storage device. The filmstrip 12 then passes through a guillotine 31 where it is cut into segments 76. The guillotine 31 is actuated in registry with the passage of image frames to cut the filmstrip 12 into segments 76. The guillotine 31 can be kept in registry in a variety of ways. For example, the guillotine 31 can be operated in response to the passage of a predetermined number of perforations or can operate on the basis of a detected film frame or data segment using a sensor as discussed above in relation to FIG. 2. The guillotine 31 can also be synchronized with the drive element 80. Cut segments 76 are moved by a segment drive 82 (illustrated as a pair of rollers 82a acting against a table 82b) into a mounter 33. In the mounter 33, the segments 76 seat in partially open film mounts 78a delivered by a feeder or mount supply 33a. A ram 84 then forces the filled mount in the direction of arrow 86 into a fastener 33b. As discussed above, mounts can be fastened together in a variety of ways. FIG. 5 illustrates a laminator 33b, in the form of a pair of pinch rollers which force the panels of the mount together to activate a pressure-sensitive adhesive layer on the mount. The write head 19, shown between the pinch rollers, writes the data unit to the mount 78. Several write heads can be used if it is desired to write on two or more of the faces and edges of the mount. Finished mounts then travel to a collector 88, drop in the direction of arrow 90, and are accumulated. Variations in this apparatus, such as interfaces to film processing or slide packaging equipment, will be readily apparent to one of skill in the art.

In a particular embodiment, the slide mounting method and apparatus are used to produce the above-discussed first improved slides 46 having film-data segments. A data correlated filmstrip can be provided in step (10) of the slide mounting method, or the slide mounting method and method for preparing photographic film units having image frame associated encoded information can be combined by adding the rerecording step (36) of the earlier method to the slide mounting method and ensuring that the cutting step (70) of the slide mounting method accommodates associated data units in the manner of the cutting step (42) of the other method. The slide mounting apparatus 66 would be modified by the additional of another writing head 19 positioned to rerecord the data units on the filmstrip.

Figure 7:
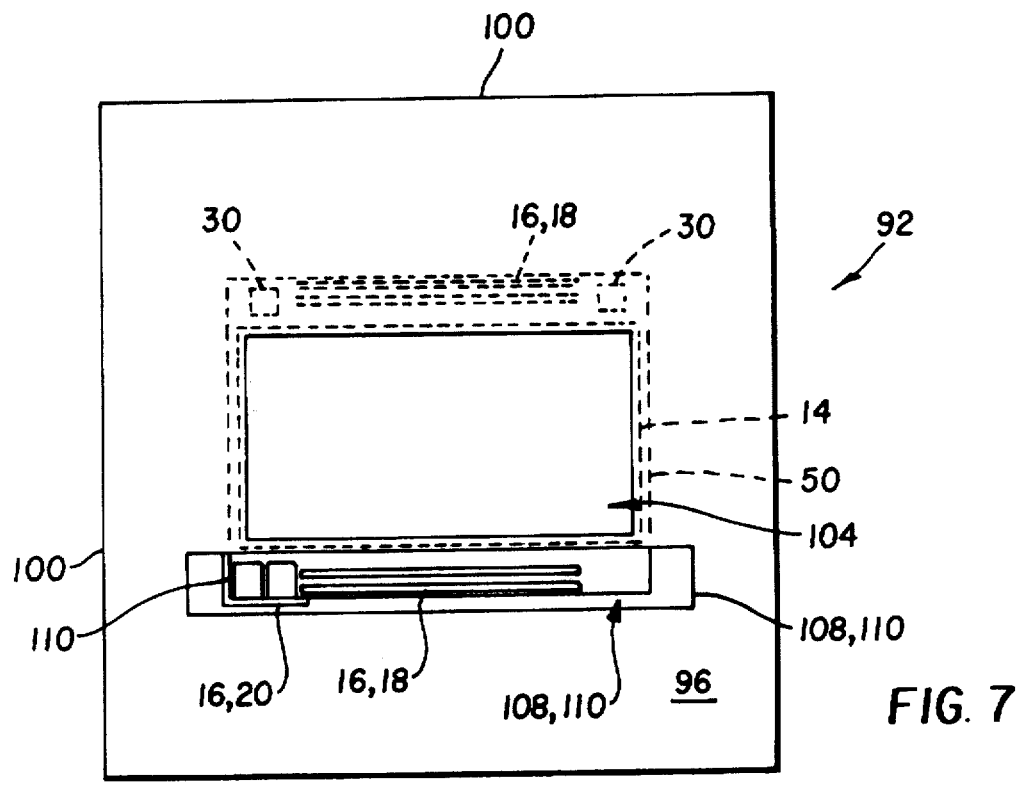
FIG. 7 is a front plan view of a second improved slide. Locations on the segment of filmstrip within the mount are indicated by dashed lines.
Figure 8:
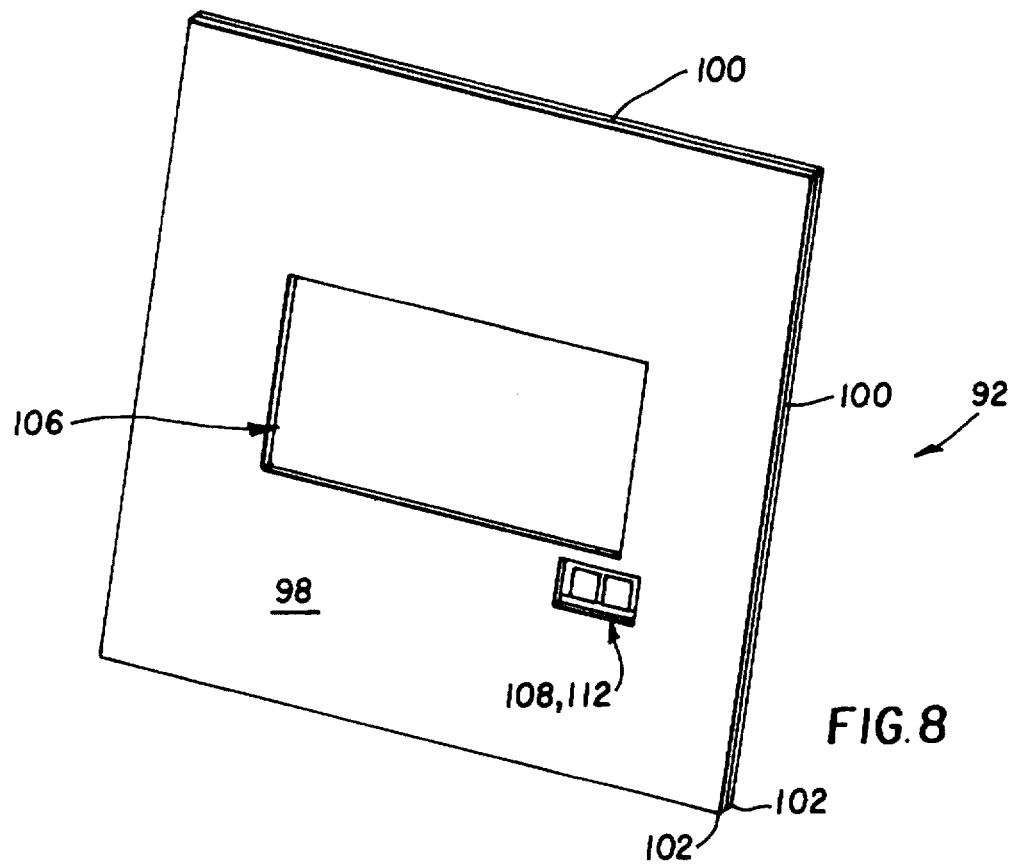
FIG. 8 is a rear perspective view of the improved slide of FIG. 7.

Referring now to FIGS. 7–8, a second improved slide 92 has a mount 94 which has front and rear faces 96,98, respectively, and two pair of opposed edges 100. The mount 94 holds a data correlated transparency 50. As in the above discussion of the first improved slide 46, the following discussion will generally refer to a data-film segment, but it will be understood that the same discussion also applies to other data correlated transparencies.

The mount 94 has one, or two, or more panels or cards 102 that are joined together over the data-film segment 50 by fasteners, adhesive or the like. FIGS. 7–8 show a slide 92 having two panels 102. The material of the panels is not critical and can be cardboard or plastic or the like. A magnetically recordable material could be used, but is not particularly advantageous unless a large amount of magnetic data storage is desired. It is not critical whether the panels can be removed from the transparency without damage.

The faces 96,98 of the mount 94 define a pair of image windows 104,106 which overlap each other and the image frame 14. The faces 96,98 also define one or more data windows 108 which at least partially overlap one or more data areas 16 of the film-data segment 50. FIGS. 7 and 8 show an embodiment in which a front data window 110 overlaps a magnetic data area 18 (illustrated as a pair of magnetic recording tracks). The front data window 110 also overlaps an optical data area 20 (shown as having a pair of optically recorded marks or dots). A back data window 112 only overlaps the optical data area 20.

The data windows 108 can be contiguous with an image window 104 or 106 of the same face 96 or 98, or can be spaced apart from the respective image window 104 or 106. A data window 108 can extend across a face 104 or 106 from one edge 100 to another, but it is currently preferred for reasons of physical integrity of the slide 92 that each data window 108 be inset from edges 100. A data window 108 can be located on the mount 94 so as to cover only part of the cumulative data areas 16. The covered data area 16 can provide an archival function. For example, a data-film segment 50 can be prepared in which a data unit is written to a pair of data areas 16 and the mount 94 can then cover one area 16 and leave the other area 16 exposed. In this case, the mount 94 or at least a part of the mount overlying the covered data area should be removable without damage to the data-film segment to provide requisite access to the covered data area.

The slide 92 can include data windows for magnetic data areas or for optical data areas or for both. A magnetic data window, that is, a data window 108 covering a magnetic data area 18, can be provided on only one face 96 or 98, since the data area 18 can be accessed from one side. Optical data areas 20 can be accessed through a pair of overlapping optical data windows or a single window can be used if the underlying mount panel 102 is sufficiently reflective. A reflective insert can be provided if needed (not shown).

The improved film projectors display still images on a frame by frame basis utilizing encoded data provided either on a filmstrip or on a slide mount. In reliance upon the encoded information, the projectors can provide without additional input, one or more of: image orientation, selection of image format, and display of annotations. These features can utilize encoded information collected at the time of image capture or provided later in an editing process. The editing process can also be utilized to provide or modify annotations or modify the image displayed, for example, by zooming and cropping, or provide other features such as playing recorded sounds.

It is preferred that the encoded information be physically correlated with a respective film frame. If the projector is for use with slides, then the first and second improved slides above-discussed are preferred. If the projector is for use with a filmstrip, then a data correlated filmstrip is preferred for reasons of the reduced film handling necessary to read data associated with an individual film frame. More preferred is a data correlated filmstrip provided in a thrust type film cassette, such as an APS™ film cassette. A thrust type film cassette simplifies the mechanisms required for physical movement of the filmstrip. A data correlated filmstrip mounted in a thrust cassette is also referred to here as a "data-thrust cartridge".

Projector features are primarily discussed herein in relation to use of a data-thrust film. Modifications necessary for slide projectors providing these same features will be readily apparent to those of skill in the art; since, except as discussed in detail herein, those modifications are a simplification of the information present here in straight-forward combination with features of known slide projectors.

Figure 9:
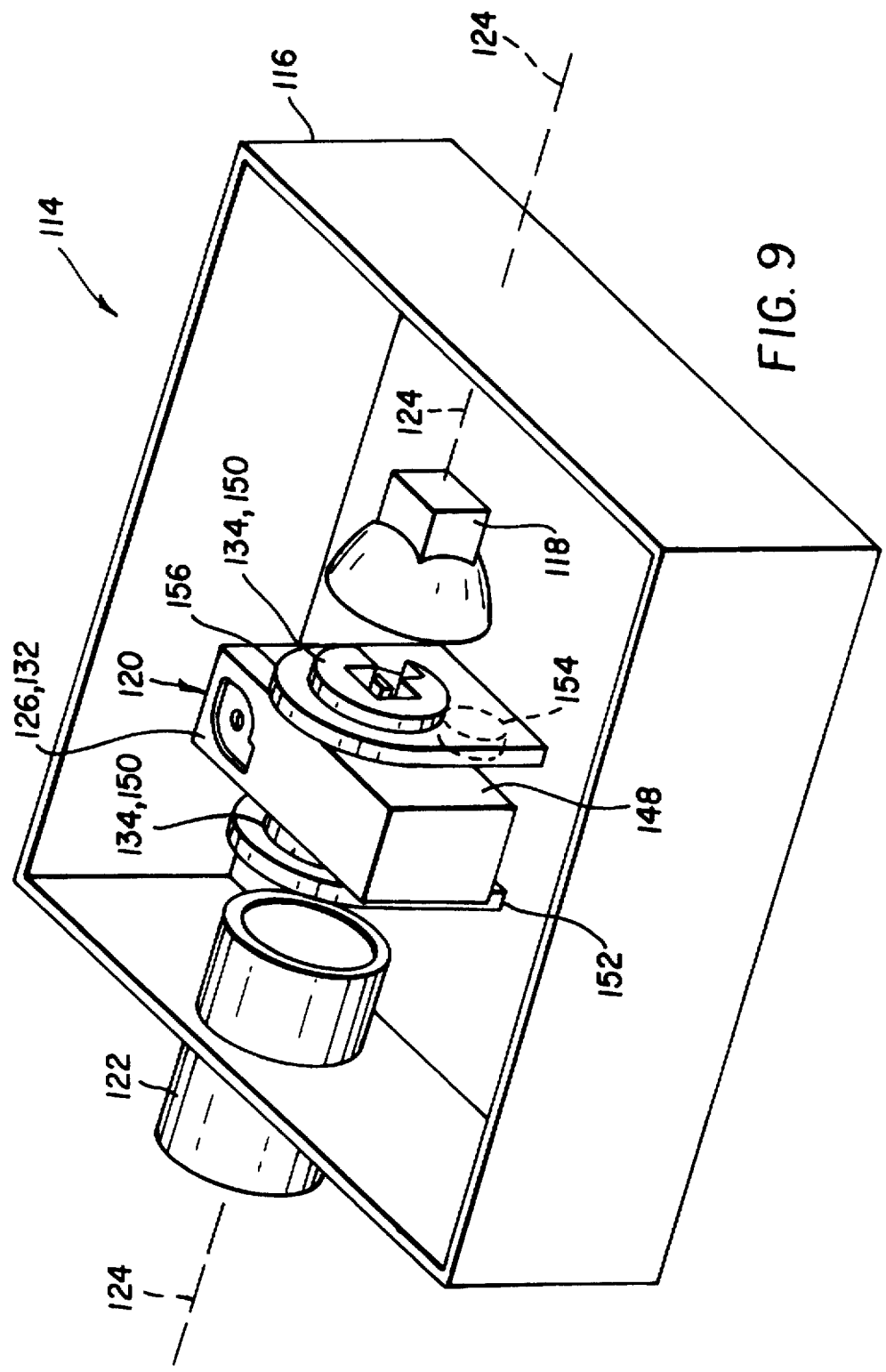
FIG. 9 is a semi-diagrammatical perspective view of an embodiment of a first improved projector. Components have been deleted for clarity. The location of a positioner is indicated by dashed lines. The film holder is show in a horizontal position.
Figure 10:
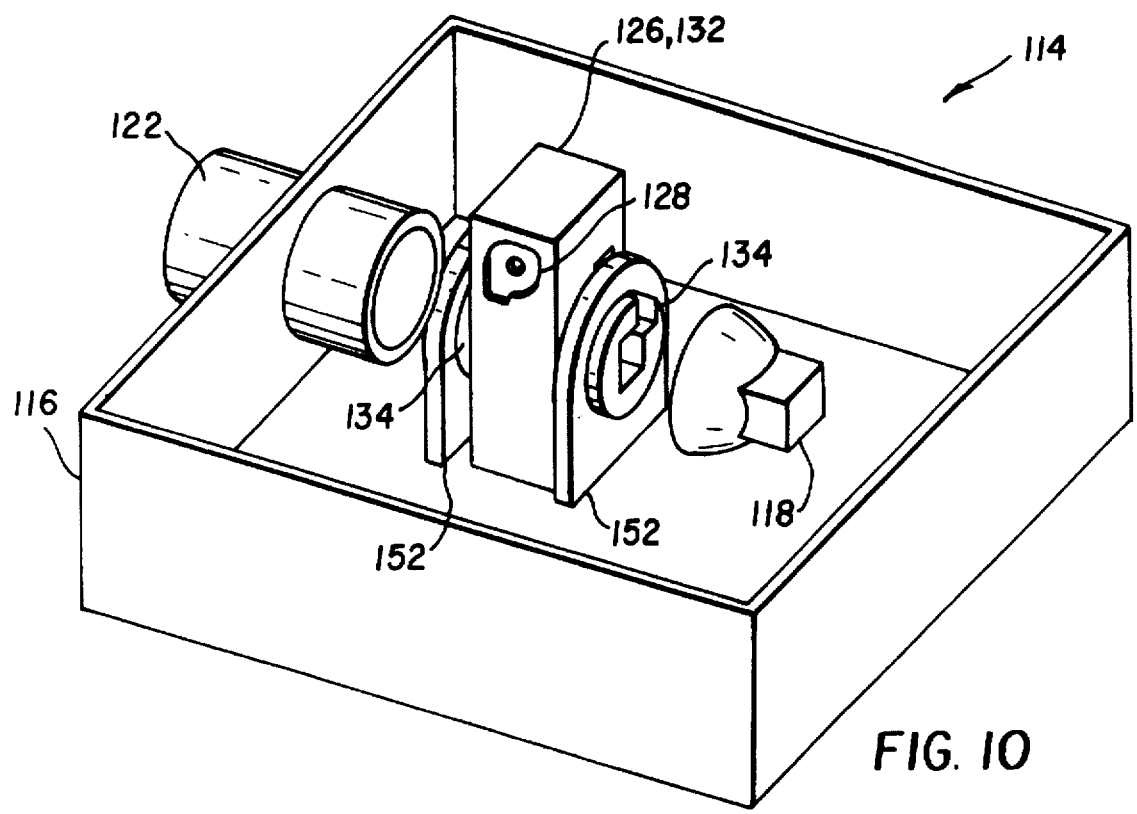
FIG. 10 is the same view as FIG. 9, but with the film holder in a first vertical position.
Figure 11:
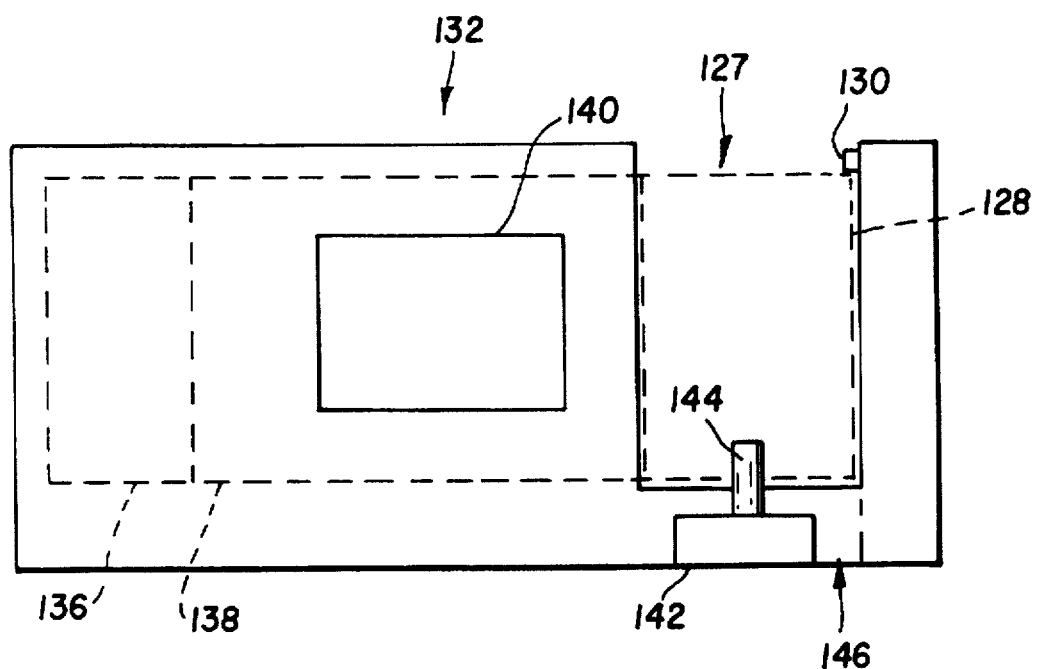
FIG. 11 is a semi-diagrammatical rear plan view of the film holder of the projector of FIG. 9. Locations for film and film canister and for an extraction slot are indicated by dashed lines.

Referring now primarily to FIGS. 9–11, the first improved projector 114 has a body 116. A light source 118 mounted in the body 116 directs a collimated beam through a film station 120 to a projection lens system 122, which propagates to light to a image plane (not shown) outside the projector 114. The light source includes a lamp and a collimator such as a parabolic mirror (not separately illustrated). The lens system 122 defines an optical axis 124.

The film station 120 includes a film holder 126 which has a chamber 127 for a film cartridge 128 and is rotatable about the optical axis between a horizontal orientation (shown in FIG. 9) and a vertical orientation (shown in FIG. 10). Preferably, the film holder 126 is rotatable about the optical axis between a horizontal orientation and two different vertical orientations. The latter accomodates image frames from cameras which can be held in either of two opposite orientations for vertical pictures. If desired, fine adjustment for slight exposure misalignments can also be provided (not shown). If desired, the film holder can also be made to rotate through 180 degrees or even 360 degrees or more. This can accomodate the very occasional image frame originally photographed upside down or can accommodate filmstrips from cameras having an opposite hand of load (cartridge orientation during film exposure). If the film holder 126 is to be rotated upside down, provision should be made to prevent the cartridge 128 from falling out of the film holder 126, by use of a spring loaded detent 130 or movable stop or the like (shown in FIG. 11).

The film holder 127 has a chamber unit 132 and a rotation element 134. The chamber unit 132 has the cartridge chamber 127, a film roll chamber 136, and a display section 138 disposed between the two chambers 127,136. The display station 138 includes a projection window 140 positioned so as to align with the individual image frames of the filmstrip in the cartridge 128. A projector film drive 142 mounted in the film holder has one or more shafts or elements 144 positioned to engage the spool of the cartridge 128, the active light lock, if present, and/or other features of the cartridge or filmstrip. Further details of a projector film drive and associated projector features useful with thrust type cartridges are disclosed in U.S. Pat. No. 5,363,156 to Tiannello et al., which is hereby incorporated herein by reference. An extraction slot 146 is provided in the film holder 126 for access by a lift mechanism for extracting the data-thrust cartridge 128.

The chamber unit 132 has opposed front and rear sides 148 which are spaced apart axially along the optical axis 124. The rotation element 134 can be fixed to one side 148 of the chamber unit 132 or the rotation element 134 can have a pair of submembers 150 fixed to both front and rear sides 148 of the chamber unit 132. The rotation element 134 rotatably engages a one or two piece support 152 fixed to the body 116. A repositioner 154, indicated by dashed lines in FIG. 9, is mounted in one or the other of the rotation element 134 and the support 154 and powers rotation of the film holder 126. The repositioner 154 can take a wide variety of forms, such as a stepper motor geared to the rotation element or a driven roller acting as friction drive against the rotation element.

Figure 12:
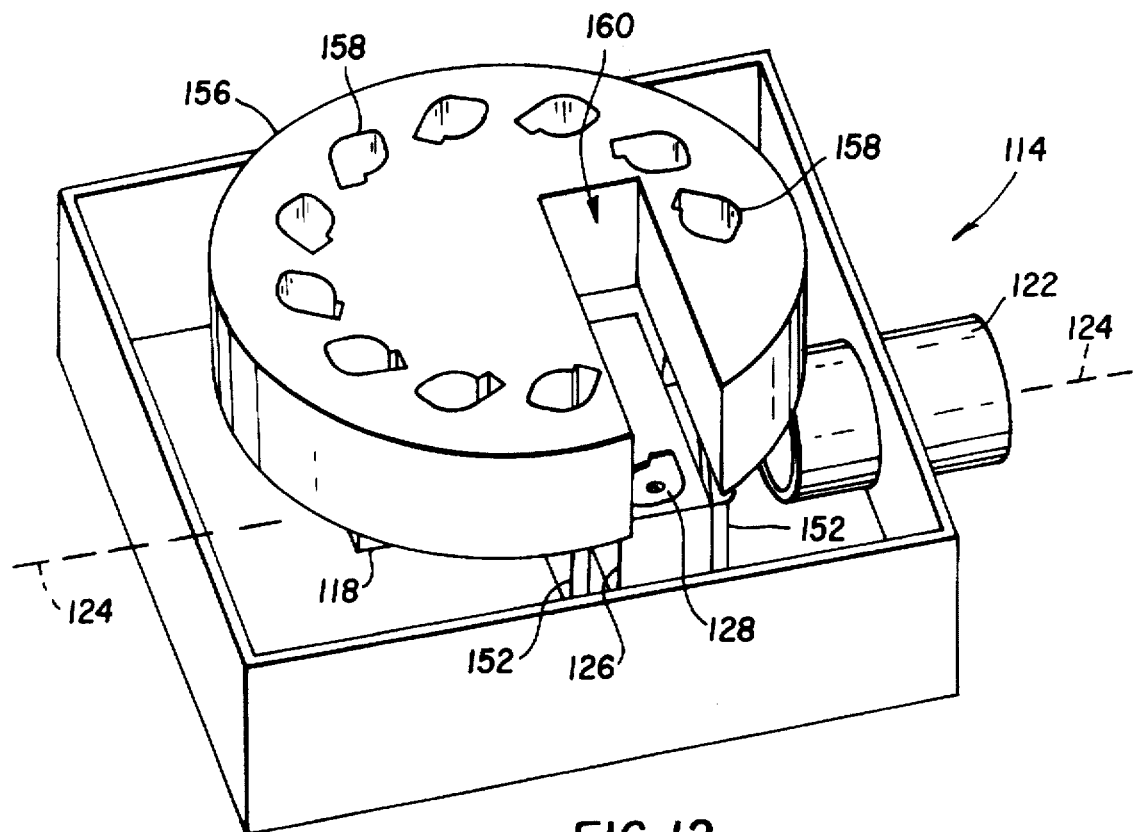
FIG. 12 is a semi-diagrammatical view of the projector of FIG. 9, but in this view a film cartridge tray is shown in a display position on the projector body. The film holder is in a horizontal position.
Figure 13:
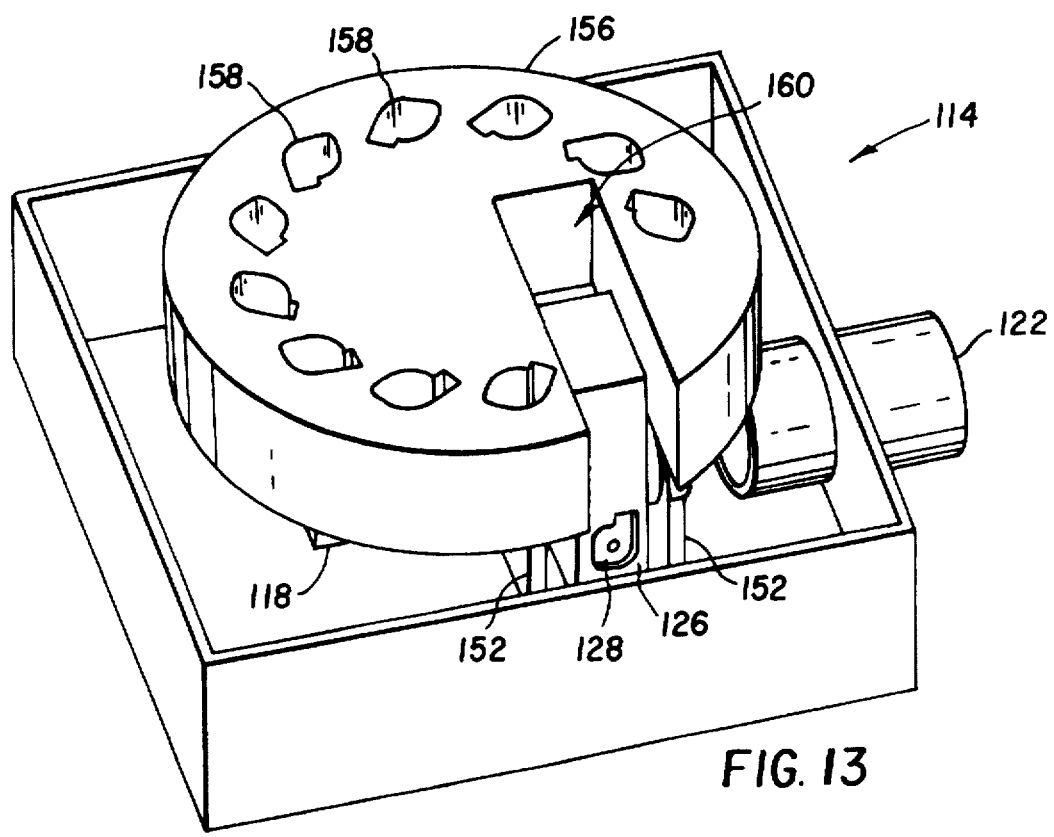
FIG. 13 is the same view as FIG. 12, but with the film holder in a second vertical position.
Figure 14:
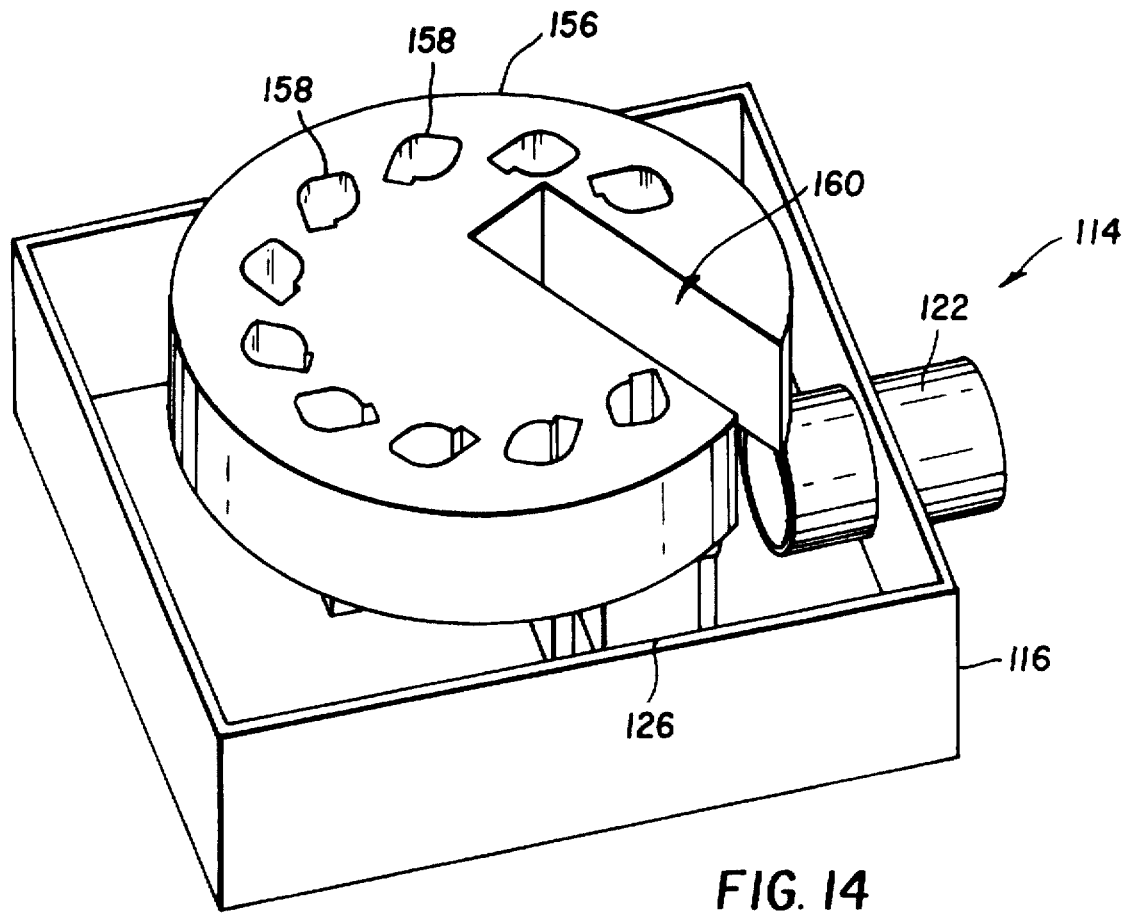
FIG. 14 is the same view as FIG. 13, but the film cartridge tray is in a loading position. The film holder is in a horizontal position.

Referring now primarily to FIGS. 12–14, the projector 114 can include a film cartridge tray 156 having a series of cartridge receivers 158. General features of a tray for thrust cartridges are disclosed in U.S. Pat. No. 5,363,156. Referring again to FIGS. 12–14, the tray 156 is mounted so as to rotate about an axis perpendicular to the optical axis 124. The tray 156 is movable between a series of loading positions, one of which is shown in FIG. 14, and a display position, shown in FIGS. 12 and 13. In each of the loading positions, a cartridge 128 can be moved in or out of the tray 156 by a lift mechanism (not shown in FIGS. 12–14). In the display position, a cartridge 128 is in the film holder 126 and a large slot 160 in the tray 156 is positioned over the film holder 126, allowing the film holder 126 to be rotated out of the horizontal position. The projector 114 can include provision for automatically rotating the tray 156 to the display position after loading, or the display position could be utilized only when rotation of the film holder 126 was desired.

Figure 15:
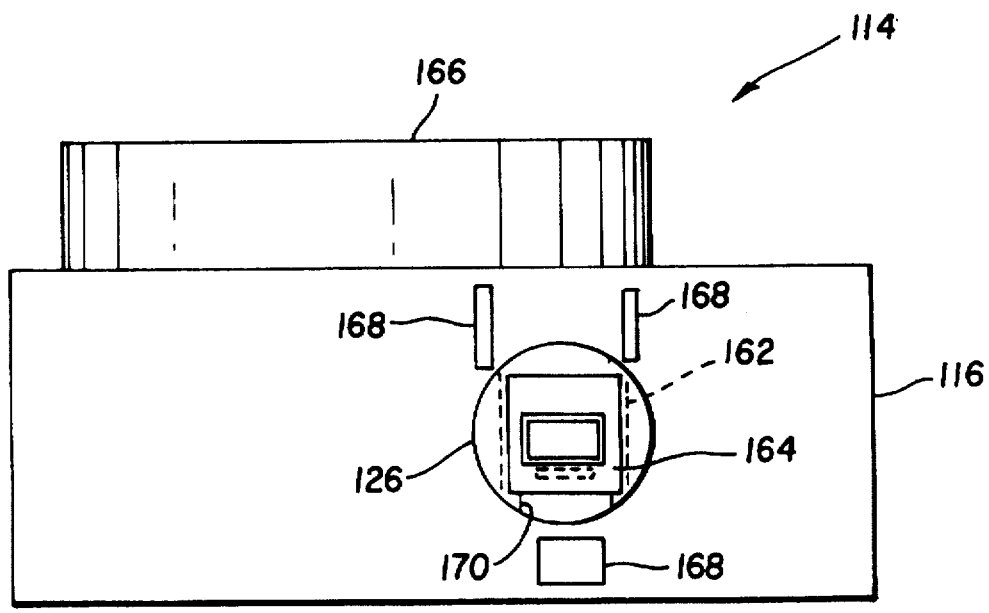
FIG. 15 is a semi-diagrammatical rear pan view of another embodiment of the first improved projector.

FIG. 15 shows another embodiment of the first improved projector 114, in which the projector 113 displays slides. The rotational element (not shown in FIG. 15) is substantially like those previously described, but the film holder 126 is much smaller, having a simple receiver 162 for the slide 164. The cartridge tray 166 and lift mechanism 168 can be made like those of conventional slide projectors, which are well known to those of skill in the art, with the exception that the lift mechanism 168 is only operable if the film holder 126 is in a horizontal position rather than a vertical position. (Otherwise the extraction slot 170 is inaccessible to the lift mechanism. The terms "horizontal" and "vertical" are somewhat arbitrary designations for the position of the film holder itself and are not indicative of the orientation of a slide within the film holder relative the film holder.)

Figure 16:
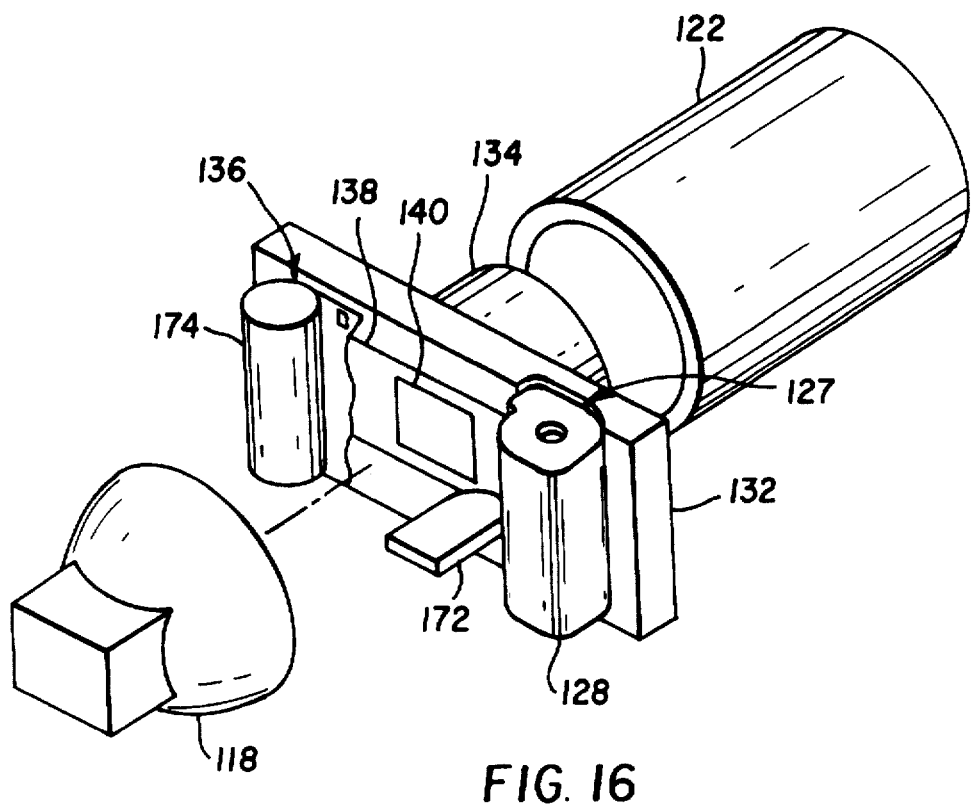
FIG. 16 is a semi-diagrammatical perspective view of the projector of FIG. 9. Components, including the body, have been deleted and the film has been cut-away for clarity.
Figure 17:
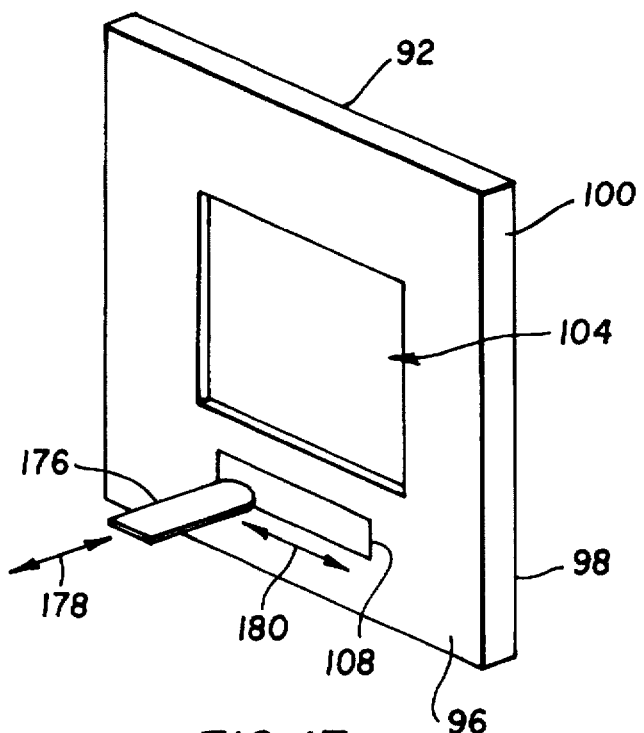
FIG. 17 is a diagrammatical perspective view of the improved slide of FIG. 7 in position to be read by the sensor of an embodiment of the projector of FIG. 15.

Images displayed by the projector 114 all appear in the correct orientation, because the film projector 114 reorients each film frame at or immediately before the time of display. Referring now to FIG. 16, a sensor 172 is positioned in or adjacent the film holder 126 so as to read encoded data either as a film frame is moved into registry with the projection window 140 or after the film frame has attained that position. The film is preferably thrust from a cartridge 128 across the display section 138 and forms a film roll 174 in the film roll chamber 136. The sensor 172 can include one or both of an optical detection head or element and a magnetic head. With optical detection relative motion of the head and data area may not be necessary. With a magnetic head, relative motion must be provided between the head and the data area of the film. Relative motion can be provided either by reading while the data area is moved past a fixed head or the magnetic head can be moved and the data area held in place. For example, the magnetic head can be reciprocated back and forth over the data area. Referring now to FIGS. 7, 8, and 17, in a projector configured for use with slides 92 having data windows 108 that are inset from the edges 100 of the slide 92, the magnetic head 176 is translated into and out of the data window 108, in the directions of arrows 178; and is reciprocated relative to the slide 92 along the data window 108, in the directions of arrows 180.

Figure 18:
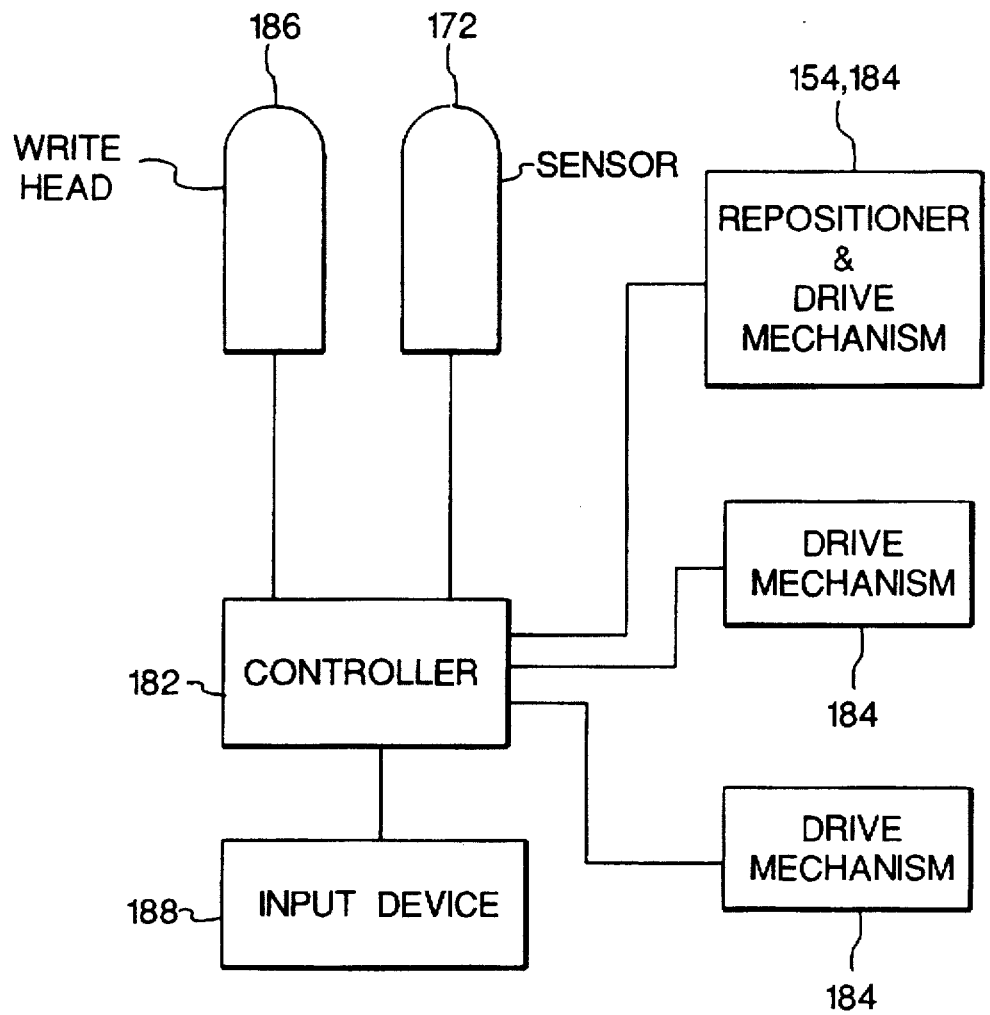
FIG. 18 is a diagrammatical view of the control system of the projector of FIG. 9.

Referring now to FIG. 18, the sensor 172 reads the encoded orientation data and sends a signal to a controller 182, such as an appropriately programmed microprocessor or computer. The controller 182 in response actuates the repositioner 154 based on predetermined parameters. Signal paths are indicated by lines 186. Other data and appropriate drive mechanisms 184 (if any), as discussed in greater detail below, are read and actuated in the same manner. The sensor 172 can include a read-write magnetic head or a write head 186 can be provided in addition to the sensor 172. An input device 188 can be made as part of the projector 114 or can be connected for modification of encoded data.

Figure 19:
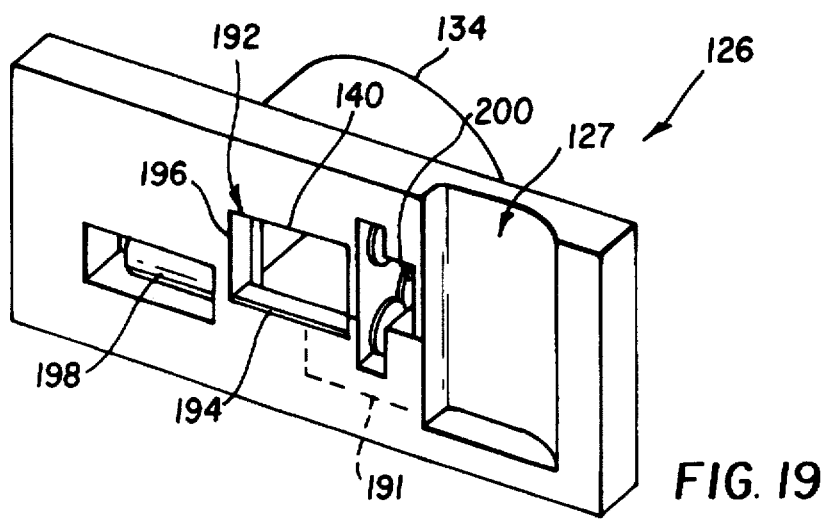
FIG. 19 is a semi-diagrammatical perspective view of an embodiment of a second improved projector. Panoramic and conventional format masks are shown in passive positions.
Figure 20:
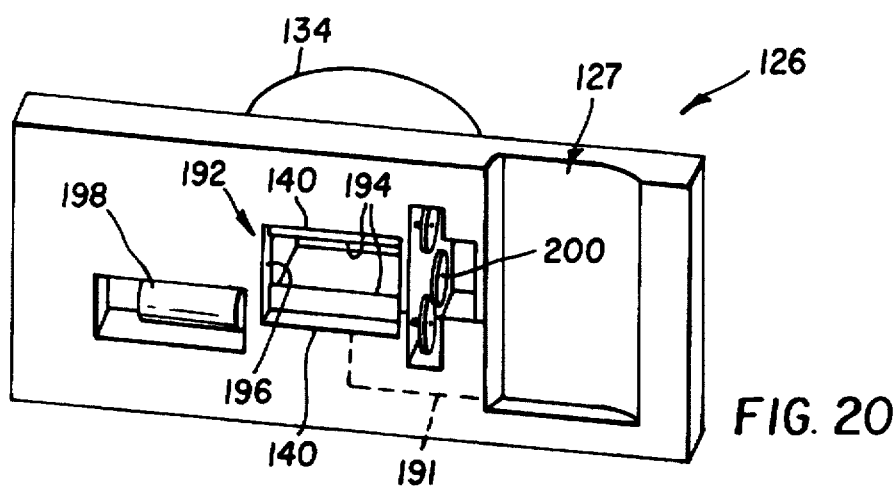
FIG. 20 is the same view as in FIG. 19, but the panoramic format mask is in an active position.
Figure 21:
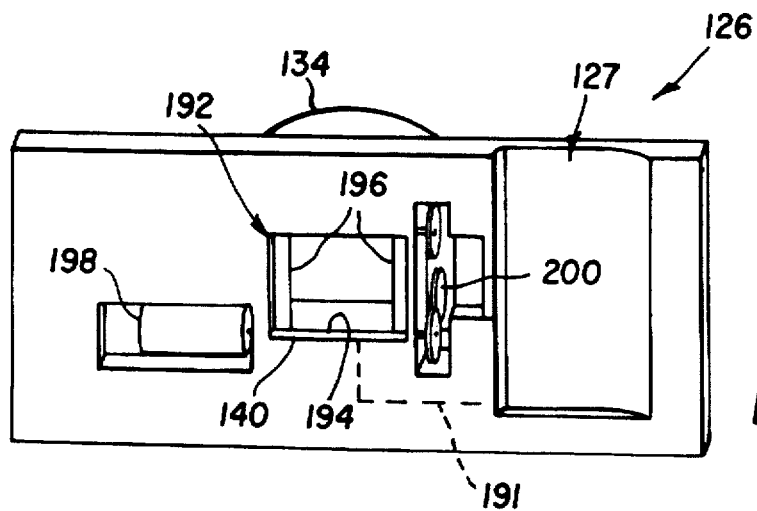
FIG. 21 is the same view as in FIG. 19, but the conventional format mask is in an active position.
Figure 22:
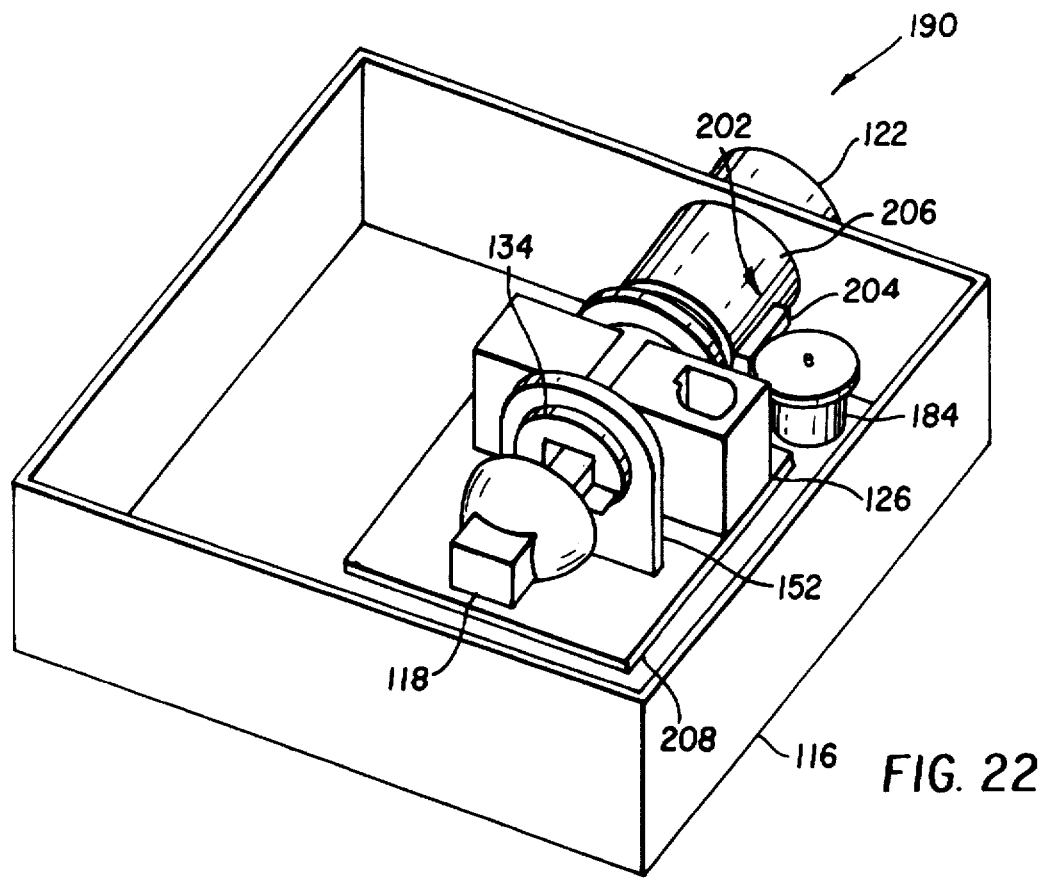
FIG. 22 is a semi-diagrammatical perspective view of another embodiment of the improved projector of FIG. 19.

Referring now to FIGS. 16 and 18–22, in a second improved projector 190, a sensor is positioned in the same manner as shown in FIG. 16, to read encoded data on the filmstrip or slide that indicates the format in which the image frame was taken. (In FIGS. 19–22, the area where the sensor contacts the film is indicated by a dashed line 191. This area is partially cut-away, as discussed below.) APS cameras, for example, can imprint this information on the film in either optical or magnetic form. The controller 182, in response to a signal from the sensor 172 displaces a formatter or gate 192 into place as necessary. FIGS. 19–21 show a film holder 126 having a projection window 140 in the shape of an H-format APS film frame. Masks 194, 196 are movable to provide P format and C format, as needed. The masks 194,196 are driven by a motor 198 connected to a geartrain 200. The motor 198 and geartrain 200 are illustrated as being exposed, however, both are preferably covered to protect against damage. The P and C formats display smaller image areas for projection. The projector can include a zoom mechanism 202, illustrated as a drive mechanism 184 geared to a rack 204 attached to a zoom element 206 of the lens system 122. The zoom mechanism 202 can automatically vary the magnification of a projected image, for example, to magnify a C image more than an H image. The same zoom mechanism could also be operated independent of format selection by use of additional "zoom" data encoded on the filmstrip or slide by the user. Similarly, this zoom feature could be provided in the first improved projector previously discussed. Format masking, in the manner of the second improved projector, could also be provided in the first improved projector in addition to the automatic image frame orienting earlier discussed. Recentering of a zoomed area can be provided by providing a horizontal-vertical positioning mechanism 208 to move the film station 120 and light source 118 in horizontal and vertical directions perpendicular to the optical axis of the lens system 122.

Figure 23:
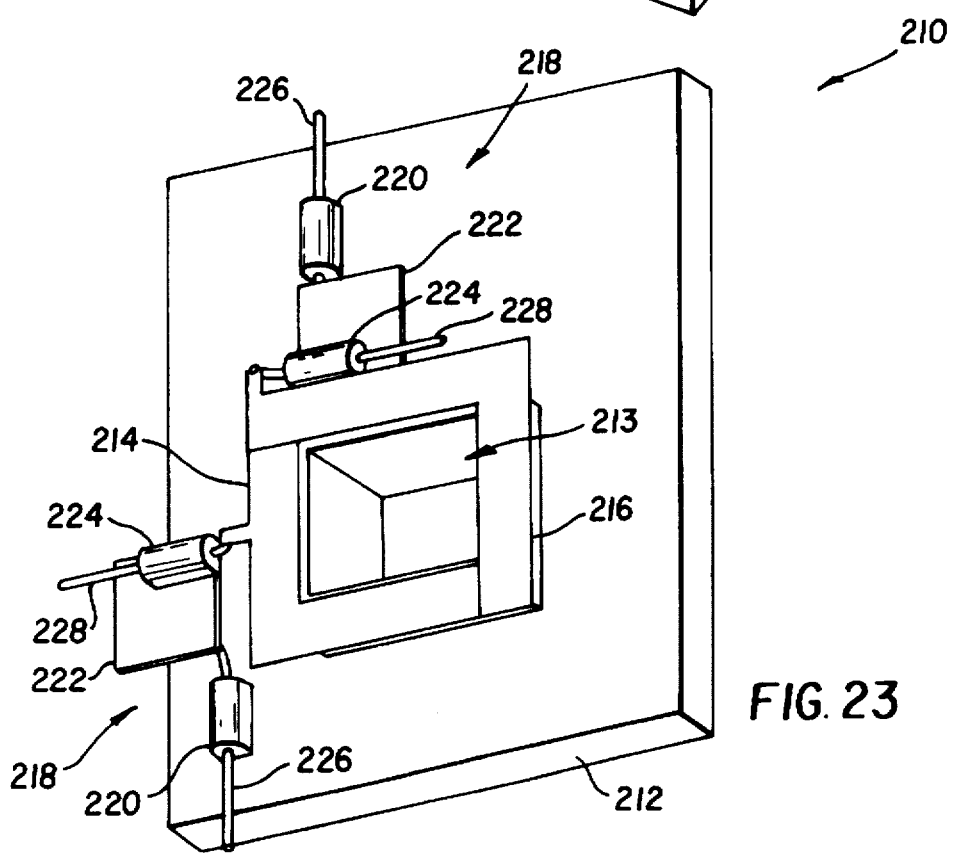
FIG. 23 is a semi-diagrammatical rear plan view of the formatting and cropping mechanism of another embodiment of the second improved projector. The cropping elements are in a fully open or "H" position.
Figure 24:
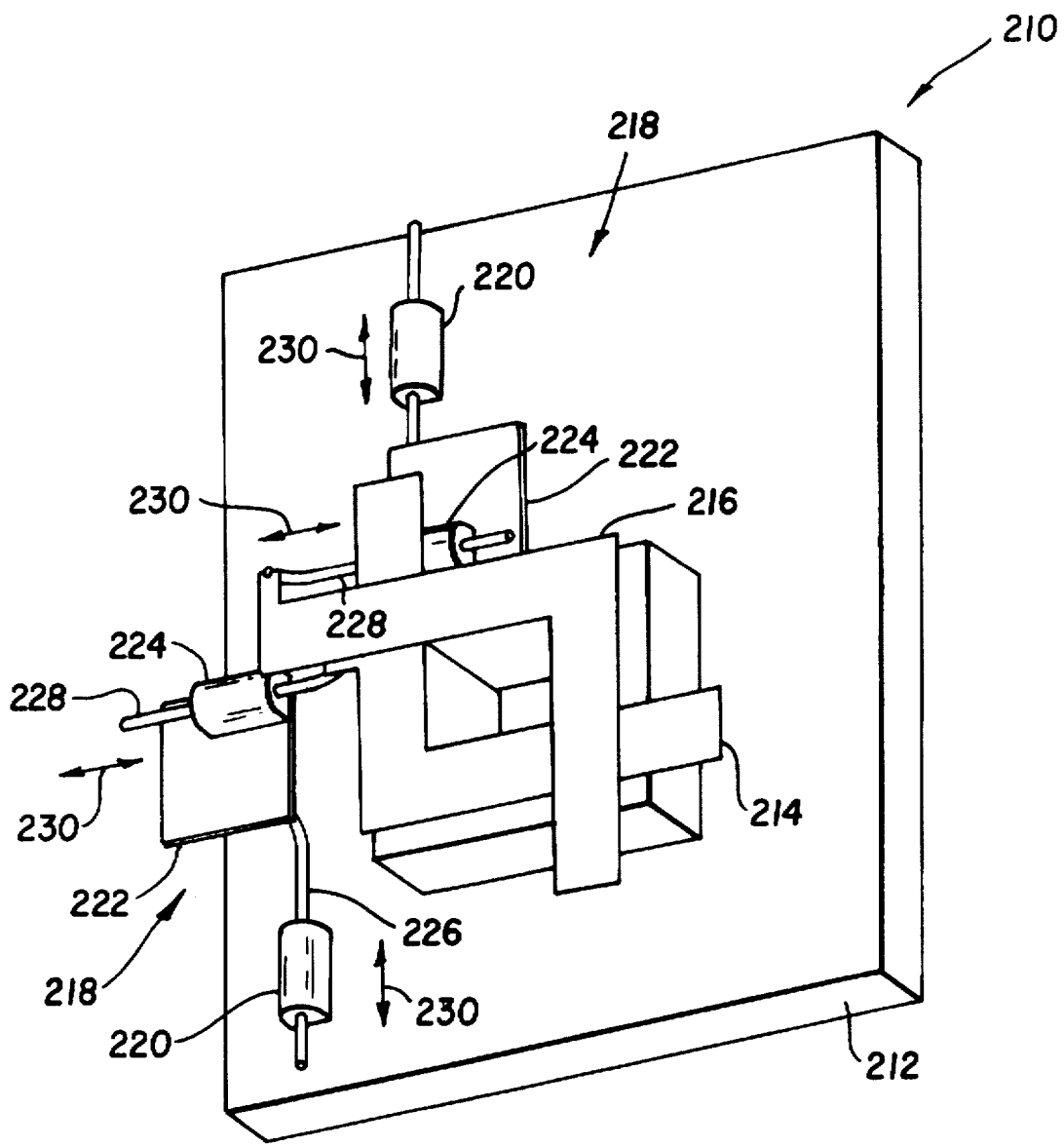
FIG. 24 is the same view as FIG. 23, but the cropping elements are both in a cropping position.

Referring now to FIGS. 23–24, in another embodiment of the second projector, the formatter providing format masking is a cropper 210, a generalized cropping mechanism. Specific formats are provided in accordance with predetermined parameters by the controller. User determined cropping could also or alternatively be provided by means of appropriate data written to the filmstrip or slide.

The cropper 210 has a support plate 212 that is mounted in the projector between the film holder and the lens system (not shown) and defines a cropping window 213 through which the projected beam passes. The cropper 210 has a pair of "L"-shaped cropping blades 214,216. The cropper 210 includes two sub-assemblies 218, each comprising a first linear stepping motor 220 fixed to the support plate 212, a movable plate 222, and a second linear stepping motor 224 fixed to the movable plate 222. Each first linear stepping motor 220 has a threaded drive shaft 226 that is fixed to a respective first movable plate 222. Each second linear stepping motor 224 has a drive shaft 228 fixed to a respective cropping blade 214 or 216. The two sub-assemblies 218 are positioned orthogonally on the same surface of the support plate 212. Directions of motion of the components are indicated by arrows 230 in FIG. 24. The cropper 210 can be mounted in the projector body so as to be movable relative to the optical axis to permit automatic or manual recentering of the cropped image. Zooming of the optical system on an automatic or manual basis can also be provided.

Figure 25:
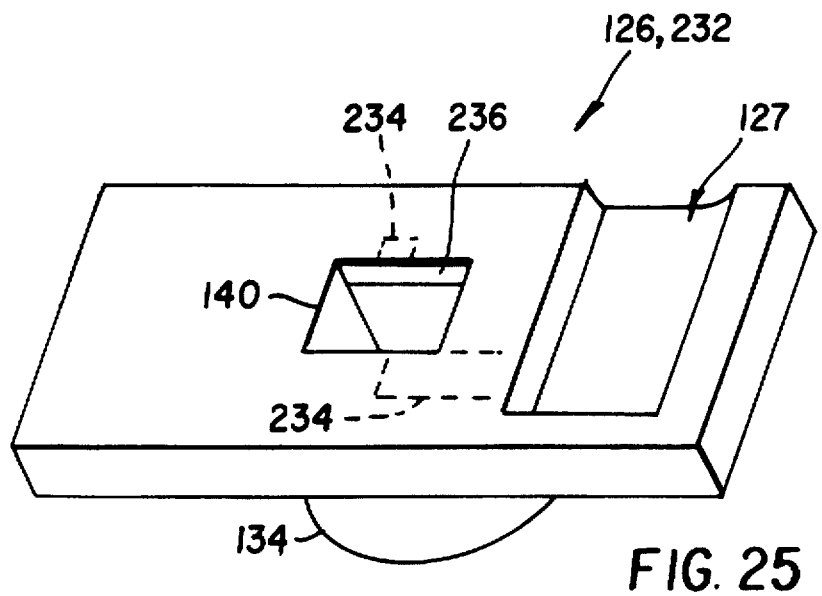
FIG. 25 is a rear lower semi-diagrammatical perspective view of the film holder of an embodiment of a third improved projector. The annotation panel is shown in a retracted position.
Figure 26:
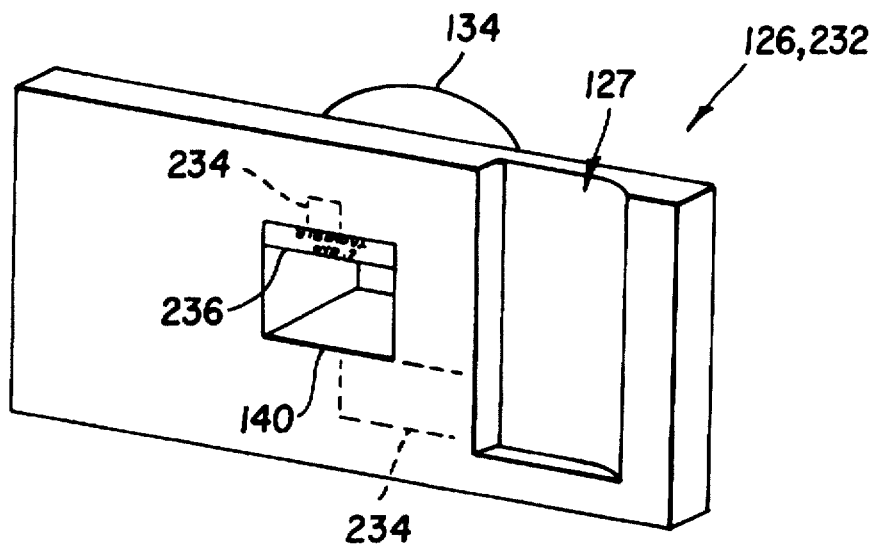
FIG. 26 is a rear semi-diagrammatical perspective view of the film holder of FIG. 25. The annotation panel is shown in an extended position.

Referring now to FIGS. 25–26, in a third improved projector 232, a sensor (not shown) is positioned to read encoded data on the filmstrip or slide that indicates annotation information created either at the time the film was exposed, or processed, or during later editing. (In FIGS. 25–26, the area where the sensor contacts the film is indicated by a dashed lines 234. As in the other projectors discussed, the sensor can have one or multiple parts, such as separate optical and magnetic heads, and can be located in a variety of different locations depending upon the area of the film segment or slide to be read.) APS cameras, for example, can also record this kind of information. The annotation information; alphanumeric material, indicia or images; can be displayed on a liquid crystal display (LCD) panel 236 or the like on the body of the projector (not shown). It is preferred that the LCD panel 236 be a transmission type LCD display permanently interposed in the projection beam, or interposable in the projection beam on a part-time basis. Details of suitable displays are well known to those of skill in the art. For example, U.S. Pat. No. 5,317,436, which is hereby incorporated herein by reference, teaches a display which can be inserted directly into a conventional slide projector. Referring to FIGS. 18 and 25–26, the controller 182 can be programmed to move the annotation display or panel 236 from a retracted position (shown in FIG. 25) to an extended position (shown in FIG. 26) whenever annotation information is available, or only for specific data, or only as desired by a user. The annotation feature can be combined with formatting, zooming, and cropping as desired on either an automatic or manual basis; however, unless provision is made for repositioning the display, use of features like formatting and cropping may interfere with the visibility of the display. The annotation feature can be combined with the film orientation feature. Since the annotation display is preferably mounted in the film holder, reorienting of the film holder also reorients such an annotation display. This can be accomodated, for example, by having the controller reorient text as required. A square display can be used to make this easier. Alternatively, one or more additional displays can be added to accommodate different positions of the film holder.

Figure 27:
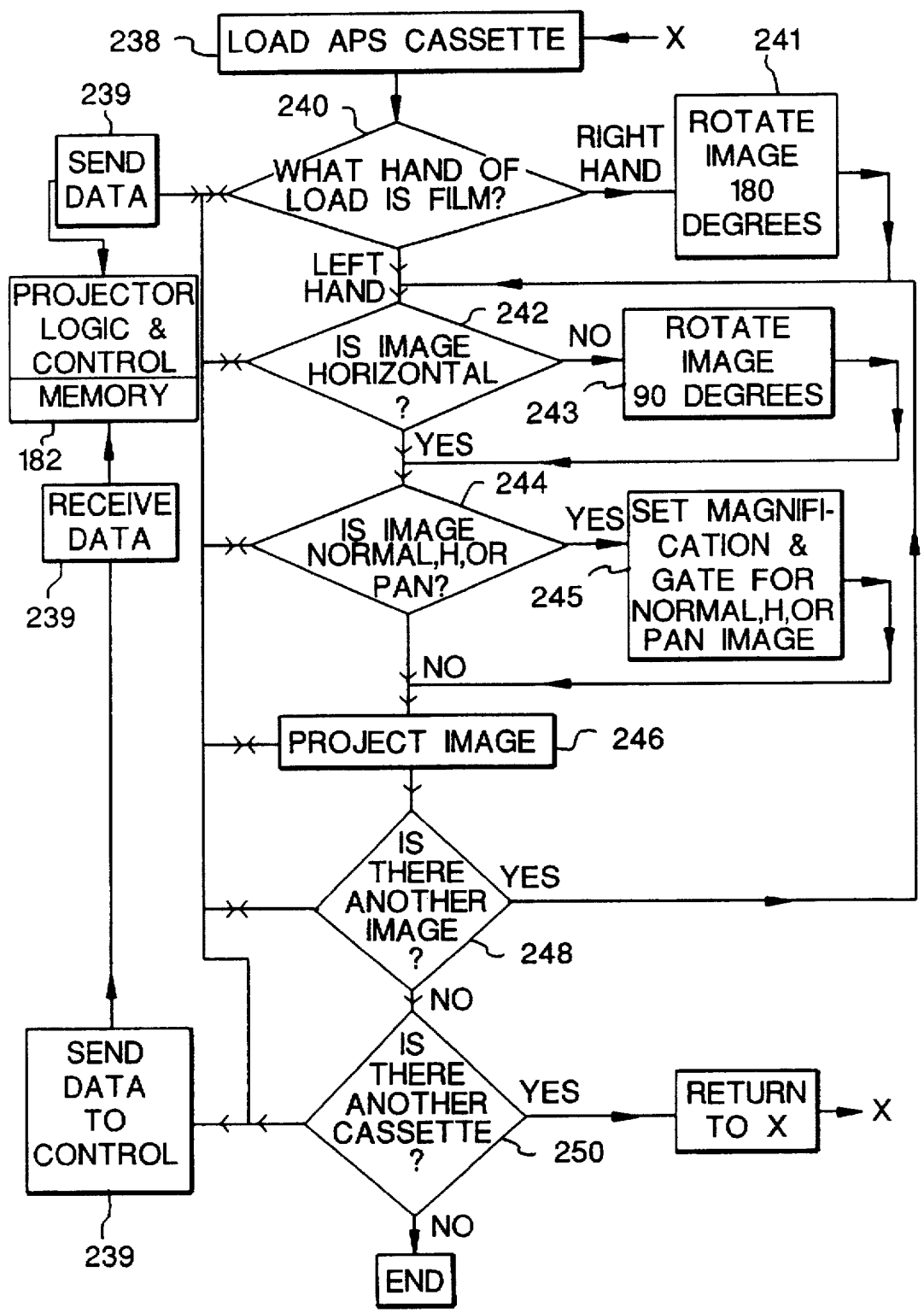
FIG. 27 is a schematic diagram illustrating the operation of a film projector having features of the first and second improved film projectors of FIGS. 9 and 19.
Figure 28:
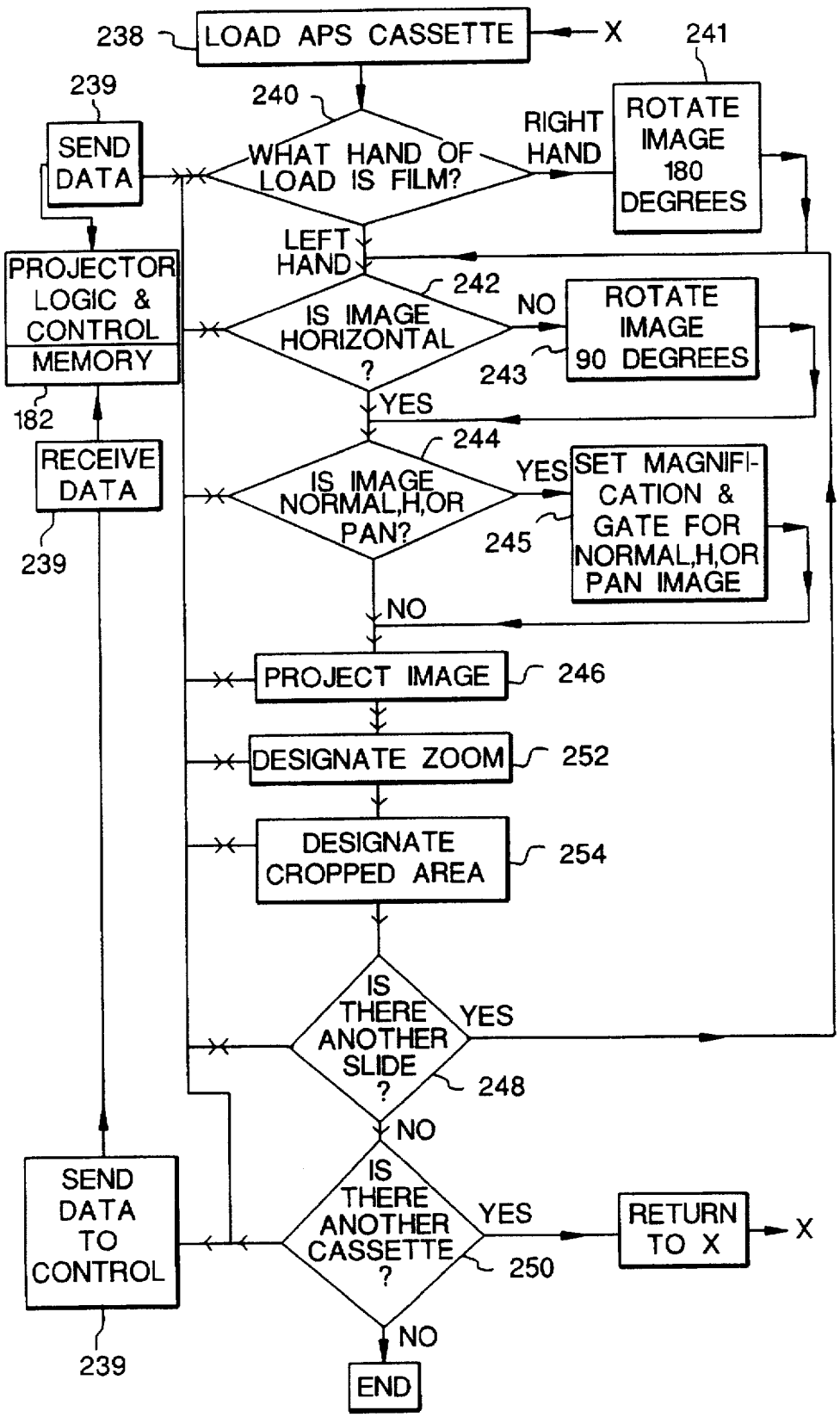
FIG. 28 is a schematic diagram illustrating the operation of an alternative embodiment of a film projector having features of the first and second improved film projectors of FIGS. 9 and 19.
Figure 29:
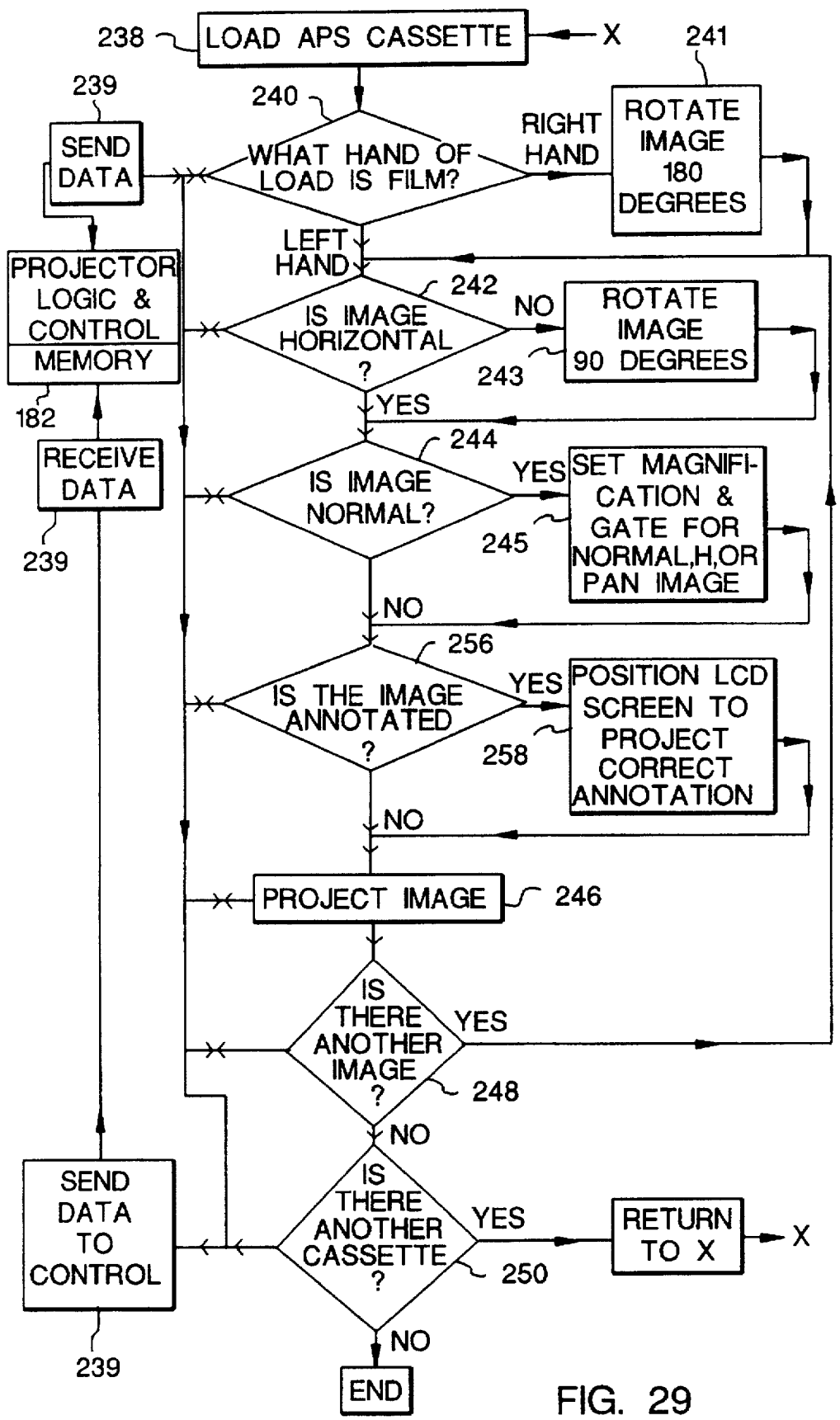
FIG. 29 is a schematic diagram illustrating the operation of a film projector having features of the first, second, and third improved film projectors of FIGS. 9, 19, and 25.

Referring now to FIGS. 18 and 27–29, the controller 182 of the projector can be programmed in a variety of ways depending upon features provided on the projector. FIGS. 27–29 illustrate flow charts for three projectors using APS data-film cartridges and providing different combinations of features. Referring first to the projector of FIG. 27, the cartridge is first loaded (238) into the projector. The data unit is read and sent to the controller 182. Determinations are made as to hand of load (240) of the camera that exposed the film (right or left), orientation (242) of the image frames (horizontal or rotated by 90 degrees), and format (244) of the image frame (Normal (C), H, or Pan (P). Signals (239) are sent from the controller 182 to respective drive mechanisms 184 to rotate the film holder and image 180 degrees (241) for right-hand of load, to rotate (243) the film holder and image 90 degrees for a vertical image, and to set (245) the zoom magnification and formatter for the determined format. The image frame is then projected (246) and the process is repeated for another image frame (248), and subsequently another cartridge (250). FIG. 28 follows a similar procedure, but includes steps in which a user can designate a zoom (252) and crop (254) which can be written to the filmstrip or slide and be used automatically by the projector the next time the image frame is viewed. FIG. 29 provides a procedure similar to that of FIG. 27, but includes a step (256) in which the controller 182 determines if annotation information is present, and if so positions (258) the LCD panel for projection of the annotations with the image frame.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

Parts list providing step (10)

filmstrip 12 read head 13 film frame or image frame 14 store 15 data areas 16 developing unit 17 magnetic data area 18
rerecord head 19
optical data area 20
backing pad 21
reading step (22)
controller 23
storing step (24)
lines 25
locating step (26)
take-up 27
external reference point 28
cartridge 29
perforations 30
cutter 31
sensor 32
mounter 33
mount supply or feeder 33a
fastener 33b
correlating step (34)
rerecording step (36)
arrows 37
boundaries 38
placing step (40)
cutting step (42)
assembling step (44)
first slide 46
mount 48
data correlated transparency or data-film segment 50
panel or card 52
front and rear faces 54,56
edges 58
windows 60,62
adhesive layer 64
recording on mount step (66)
correlating step 68
cutting step 70
recording step 72
assembling step 74
film segments 76
mounts 78
partially open film mounts 78a
drive element 80
segment drive 82
rollers 82a
table 82b
ram 84
arrow 86
collector 88
arrow 90
second improved slide 92
mount 94
front and rear faces 96,98
edges 100
panels 102
image windows 104,106
data window 108 front data window 110
back data window 112
first projector 114
body 116
light source 118
film station 120
projection lens system 122
optical axis 124
film holder 126
film cartridge chamber 127
cartridge 128
detent or stop 130
chamber unit 132
rotation element 134
film roll chamber 136
display section 138
projection window 140
projector film drive 142
shaft 144
extraction slot 146
sides (of chamber unit) 148
submembers 150
support 152
repositioner 154
cartridge tray 156
receivers 158
slot (in tray) 160
slide receiver 162
slide 164
cartridge tray 166
lift mechanism 168
extraction slot 170
sensor 172
film roll 174
magnetic head 176
arrows 178
arrows 180
controller 182
drive mechanism 184
write head 186
input device 188
projector 190
dashed line 191
formatter 192
masks 194,196
motor 198
geartrain 200
zoom mechanism 202
rack 204
zoom element 206
horizontal-vertical positioning mechanism 208
cropper 210
support plate 212
cropping window 213
cropping blades 214,216
sub-assemblies 218 first linear stepping motor 220
movable plate 222
second linear stepping motor 224
drive shaft 226
drive shaft 228
arrows 230
third projector 232
dashed line 234
LCD display 236
load cartridge (238)
signals 239
determine hand of load (240)
rotate 180 degrees (241)
determine orientation (242)
rotate 90 degrees (243)
determine format (244)
project image (246)
repeat for another frame (248)
repeat for another cartridge (250)
designate zoom (252)
designate crop (254)
determine if annotated (256)
position LCD (258)

What is claimed is:

1. A film slide comprising a transparency having an image section bearing a visual image and a data section bearing encoded data relating to said visual image; and a mount having front and back panels, said panels each defining an image window overlapping said image section, at least one of said panels defining a data window overlapping said data section.

2. The film slide of claim 1 wherein one of said panels defines said data window and the other said panel overlaps said data window.

3. The film slide of claim 1 wherein said data section has an exposed subsection overlapped by said data window and a protected subsection covered by said mount.

4. The film slide of claim 3 wherein said exposed subsection includes optically readable data.

5. The film slide of claim 1 wherein said data window is non-contiguous with said image window.

6. The film slide of claim 1 wherein said mount has said two pair of opposed edges, and said data window is spaced apart from said edges.

7. The film slide of claim 1 wherein said mount has front and back surfaces and two pair of opposed edges and said mount supports said transparency in spaced relation to said surfaces and said edges.

* * * * *